United States Patent
Kwon et al.

(10) Patent No.: US 9,124,870 B2
(45) Date of Patent: Sep. 1, 2015

(54) THREE-DIMENSIONAL VIDEO APPARATUS AND METHOD PROVIDING ON SCREEN DISPLAY APPLIED THERETO

(75) Inventors: Oh-jae Kwon, Suwon-si (KR); Jong-sul Min, Hwaseong-si (KR); Young-wook Sohn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1012 days.

(21) Appl. No.: 12/416,192

(22) Filed: Apr. 1, 2009

(65) Prior Publication Data

US 2010/0045780 A1      Feb. 25, 2010

(30) Foreign Application Priority Data

Aug. 20, 2008  (KR) .................. 10-2008-0081376

(51) Int. Cl.
  *H04N 13/00*      (2006.01)
(52) U.S. Cl.
  CPC ......... *H04N 13/007* (2013.01); *H04N 13/0048* (2013.01); *H04N 2213/007* (2013.01)
(58) Field of Classification Search
  None
  See application file for complete search history.

(56) References Cited

U.S. PATENT DOCUMENTS

| | | | |
|---|---|---|---|
| 6,225,979 B1 * | 5/2001 | Taima et al. | 345/157 |
| 6,480,238 B1 * | 11/2002 | Knox et al. | 348/569 |
| 2004/0239685 A1 | 12/2004 | Kiyokawa et al. | |
| 2006/0285016 A1 * | 12/2006 | Yamagata et al. | 348/569 |
| 2007/0136681 A1 * | 6/2007 | Miller | 715/782 |
| 2008/0303896 A1 * | 12/2008 | Lipton et al. | 348/49 |

FOREIGN PATENT DOCUMENTS

| | | | | |
|---|---|---|---|---|
| CN | 1239626 A | | 12/1999 | |
| JP | 2005184705 A | * | 7/2005 | |
| KR | 10-2007-0006282 A | | 1/2007 | |
| KR | 10-2007-0025221 A | | 3/2007 | |
| KR | 10-2007-0089305 A | | 8/2007 | |
| KR | 20070089305 A | * | 8/2007 | ............ H04N 13/00 |
| WO | 98/17057 A1 | | 4/1998 | |

OTHER PUBLICATIONS

Communication dated Apr. 3, 2013 from the State Intellectual Property Office of P.R. China in a counterpart application No. 200910161450.8.
Communication dated Sep. 3, 2014, issued by the State Intellectual Property Office of P.R. China in counterpart Chinese Application No. 200910161450.8.
Communication from the Korean Intellectual Property Office dated Mar. 31, 2015 in a counterpart Korean application No. 10-2009-0051037.

* cited by examiner

*Primary Examiner* — Dave Czekaj
*Assistant Examiner* — Nam Pham
(74) *Attorney, Agent, or Firm* — Sughrue Mion, PLLC

(57) ABSTRACT

A three-dimensional (3D) video apparatus and a method of providing an OSD object applied thereto are provided. The 3D video apparatus includes an on-screen display (OSD) generation unit which receives an OSD object and generates a reduced OSD object to be displayed on the 3D image on a screen, wherein the reduced OSD object is smaller than the received OSD object. An OSD insertion unit inserts the reduced OSD object into input 3D image data.

22 Claims, 18 Drawing Sheets

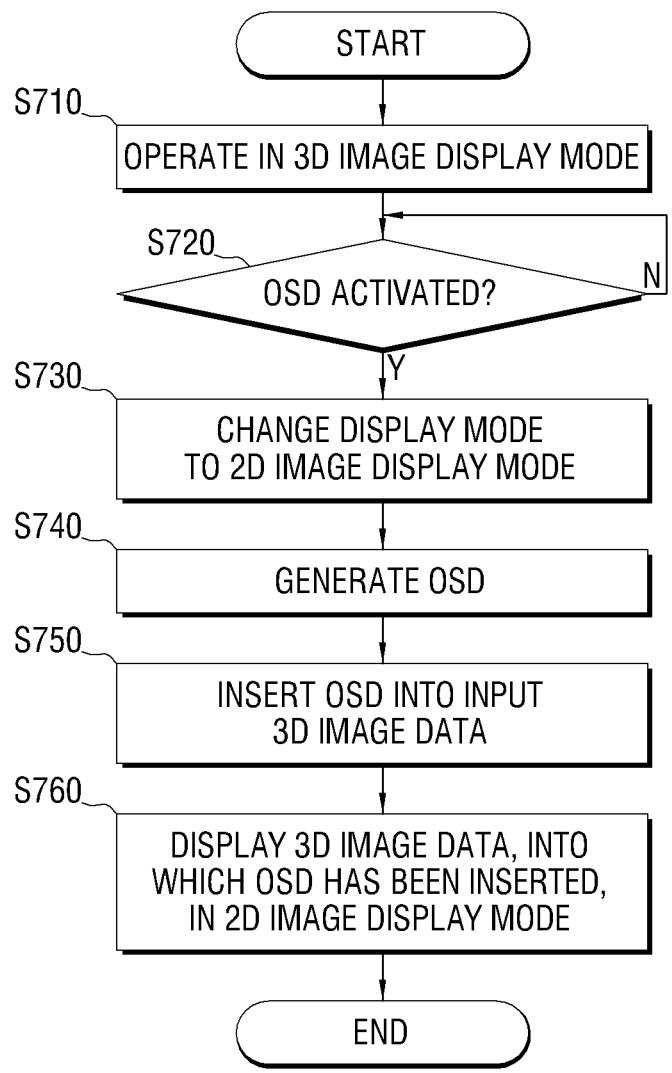

HORIZONTAL
INTERLEAVING METHOD

VERTICAL INTERLEAVING
METHOD

CHECKER BOARD
METHOD

SIDE-BY-SIDE TYPE

ABOVE-BELOW TYPE

2D+DEPTH TYPE

THREE-DIMENSIONAL VIDEO APPARATUS AND METHOD PROVIDING ON SCREEN DISPLAY APPLIED THERETO

CROSS-REFERENCE TO RELATED APPLICATIONS

This application claims priority from Korean Patent Application No. 2008-0081376, filed Aug. 20, 2008, in the Korean Intellectual Property Office, the entire disclosure of which is incorporated herein by reference.

BACKGROUND OF THE INVENTION

1. Field

Methods and devices consistent with the present invention relate to a three-dimensional (3D) video apparatus and a method of providing an on-screen display (OSD) applied thereto. More particularly, the present invention relates to a 3D video apparatus and a method of providing an OSD applied thereto, which can represent a 3D image through an alternate display of a left-eye image and a right-eye image.

2. Description of the Related Art 3D stereoscopic video technology has diverse application fields, such as information and communications, broadcasting, medical care, education and training, military affairs, games, animation, virtual reality, computer automated design (CAD), industrial technology, and the like, and is the core basic technology for the next-generation stereoscopic multimedia information and communications commonly required in such various fields.

Generally, 3D effect that the human eyes perceive occurs through complex action of a change of lens thickness according to the position of an object, the angle difference between the human eyes and an object, the difference in position and shape of an object seen by the left and right eyes, the disparity occurring in accordance with movement of an object, effects by various kinds of psychology and memory, and the like.

Among them, the binocular disparity, which refers to the difference in image location of an object seen by the left and right eyes, resulting from the eyes' horizontal separation of about 6~7 cm, is the most important factor of the 3D effect. That is, due to the binocular disparity, the left and right eyes see an object with the angle difference, and due to this difference, images coming into the respective eyes have different phases. These two images are transferred to the brain through retinas of the respective eyes, and the brain feels the original 3D stereoscopic image by accurately synthesizing the transferred information.

Examples of a 3D image display apparatus include a glasses type apparatus using special glasses and a glasses-free type apparatus using no special glasses. The glasses type apparatus is classified into a color filter type for separating and selecting images using color filters having a complementary color relation with each other, a polarization filter type for separating a left-eye image and a right-eye image using a light shading effect by a combination of orthogonal polarizing elements, and a shutter glasses type for alternately intercepting the left eye and the right eye corresponding to a sync signal for projecting a left-eye image signal and a right-eye image signal onto a screen to feel the 3D effect.

A 3D image is composed of a left-eye image recognized by left eye and a right-eye image recognized by right eye, and a 3D display apparatus expresses a 3D effect of an image using the disparity between the lift-eye image and the right-eye image.

On the other hand, it is sometimes required for the 3D video apparatus to support an OSD menu. However, if an OSD object is inserted into an input 3D image using the existing method in the process of displaying the 3D image through separation of the 3D image into a left-eye image and a right-eye image, the OSD object may be displayed abnormally or the picture quality of the OSD object may deteriorate.

Accordingly, there is a need for improved methods and apparatuses for providing an OSD in a 3D video apparatus.

SUMMARY OF THE INVENTION

Exemplary embodiments of the present invention overcome the above problems and/or disadvantages and other disadvantages not described above. Also, the present invention is not required to overcome the disadvantages described above, and an exemplary embodiment of the present invention may not overcome any of the problems described above.

An aspect of embodiments of the present invention is to normally provide an OSD in a 3D video apparatus, and to provide a 3D video apparatus and a method of providing an OSD applied thereto, which, in the case of generating an OSD to be displayed on a 3D image, generate a reduced OSD that is smaller than an OSD being displayed on a two-dimensional (2D) image, and insert the generated OSD into 3D image data.

Another exemplary aspect of the present invention provides a 3D video apparatus and a method of providing an OSD applied thereto, which insert a generated OSD into interpolated left-eye and right-eye images.

Another exemplary aspect of the present invention provides a 3D video apparatus and a method of providing an OSD applied thereto, which change a 3D image display mode to a 2D image display mode if an OSD is activated while the 3D video apparatus operates in the 3D image display mode.

According to an aspect of the present invention, there is provided a 3D video apparatus for representing a 3D image is provided, according to exemplary embodiments of the present invention, which includes an OSD generation unit for generating a reduced OSD that is smaller than an OSD being displayed on a two-dimensional (2D) image in the case of generating an OSD to be displayed on the 3D image; and an OSD insertion unit for inserting the generated OSD into input 3D image data.

In the case where the input 3D image data includes left-eye image data and right-eye image data, the OSD generation unit may generate the OSD through reduction of the size of the OSD to correspond to an image size of the left-eye image data or the right-eye image data.

The OSD insertion unit may insert the generated OSD into at least one of the left-eye image data and the right-eye image data.

In the case where the input 3D image data includes the left-eye image data and the right-eye image data included in a left data region and a right data region of a frame data region, respectively, the OSD generation unit may generate the OSD through reduction of the size of the OSD in a horizontal direction.

In the case where the input 3D image data includes the left-eye image data and the right-eye image data included in an upper data region and a lower data region of a frame data region, respectively, the OSD generation unit may generate the OSD through reduction of the size of the OSD in a vertical direction.

In the case where the input 3D image data includes 2D image data and depth data, the OSD generation unit may generate the OSD through reduction of the size of the OSD in proportion to the size of the 2D image data.

The OSD insertion unit may insert the generated OSD into the 2D image data.

The OSD generation unit may generate the OSD through reduction of either of the size of the OSD in the horizontal direction and the size of the OSD in the vertical direction.

The OSD insertion unit may insert the generated OSD into one of the input 3D image data regions, which corresponds to one of four-divided screen regions that is positioned on a left upper part of the screen.

According to another aspect of the present invention, there is provided a method of providing an OSD in a 3D video apparatus, which includes generating a reduced OSD that is smaller than an OSD being displayed on a two-dimensional (2D) image in the case of generating an OSD to be displayed on the 3D image; and inserting the generated OSD into input 3D image data.

The operation of generating the OSD may include, in the case where the input 3D image data includes left-eye image data and right-eye image data, generating the OSD through reduction of the size of the OSD to correspond to an image size of the left-eye image data or the right-eye image data.

The operation of inserting the OSD may include inserting the generated OSD into at least one of the left-eye image data and the right-eye image data.

The operation of generating the OSD may include, in the case where the input 3D image data includes the left-eye image data and the right-eye image data included in a left data region and a right data region of a frame data region, respectively, generating the OSD through reduction of the size of the OSD in a horizontal direction.

The operation of generating the OSD may include, in the case where the input 3D image data includes the left-eye image data and the right-eye image data included in an upper data region and a lower data region of a frame data region, respectively, generating the OSD through reduction of the size of the OSD in a vertical direction.

The operation of generating the OSD may include, in the case where the input 3D image data includes 2D image data and depth data, generating the OSD through reduction of the size of the OSD in proportion to the size of the 2D image data.

The operation of inserting the OSD may include inserting the generated OSD into the 2D image data.

The operation of generating the OSD may include generating the OSD through reduction of either of the size of the OSD in the horizontal direction and the size of the OSD in the vertical direction.

The operation of inserting the OSD may include inserting the generated OSD into one image data region among the input 3D image data regions, which corresponds to one screen region among four-divided screen regions of a screen that is positioned on a left upper part of the screen.

According to still another aspect of the present invention, there is provided a 3D video apparatus for representing a 3D image, which includes a 3D representation unit for generating a left-eye image and a right-eye image to be displayed on a screen using input 3D image data; an OSD generation unit for generating an OSD; and an OSD insertion unit for inserting the generated OSD into at least one of the left-eye image and the right-eye image.

According to still another aspect of the present invention, there is provided a method of providing an OSD in a 3D video apparatus, which includes generating a left-eye image and a right-eye image to be displayed on a screen using input 3D image data; generating an OSD; and inserting the generated OSD into at least one of the left-eye image and the right-eye image.

According to still another aspect of the present invention, there is provided a 3D video apparatus for representing a 3D image, which includes an OSD generation unit for generating an OSD; an OSD insertion unit for inserting the generated OSD into an input 3D image; and a control unit for changing a display mode of the 3D video apparatus from a 3D image display mode to a 2D image display mode and displaying the 3D image into which the OSD has been inserted in the 2D image display mode if the OSD is activated while the 3D video apparatus operates in the 3D image display mode.

According to still another aspect of the present invention, there is provided a method of providing an OSD in a 3D video apparatus for representing a 3D image, which includes changing a display mode of the 3D image video apparatus from a 3D image display mode to a 2D image display mode if the OSD is activated while the 3D video apparatus operates in the 3D image display mode; generating the OSD; inserting the OSD into an input 3D image; and displaying the 3D image into which the OSD has been inserted in the 2D image display mode.

According to still another aspect of the present invention, there is provided a three-dimensional (3D) video apparatus for representing a 3D image, which includes an on-screen display (OSD) generation unit which generates a first OSD object to be displayed in a 3D image display mode on a screen, wherein the first OSD object is smaller than a second OSD object which is used for a two-dimensional (2D) image mode; and an OSD insertion unit which inserts the first OSD object into input 3D image data.

The input 3D image data may include a left-eye image data and a right-eye image data, and the OSD insert unit may insert the first OSD object into at least one of the left-eye image data and the right-eye image data.

The OSD generation unit may determine size of the first OSD object in a horizontal direction or in a vertical direction corresponding to size of the left-eye image data or the right-eye image data.

BRIEF DESCRIPTION OF THE DRAWINGS

The above aspects and features of the present invention will become more apparent by describing certain exemplary embodiments of the present invention with reference to the accompanying drawings, in which:

FIG. 7 is a flowchart illustrating a method of providing an OSD, which changes a display mode of a 3D video apparatus from a 3D image display mode to a 2D image display mode when the OSD is activated in the 3D image display mode, according to still another exemplary embodiment of the present invention;

Throughout the drawings, like reference numerals will be understood to refer to like parts, components and structures.

DETAILED DESCRIPTION OF EXEMPLARY EMBODIMENTS

Figure 1:
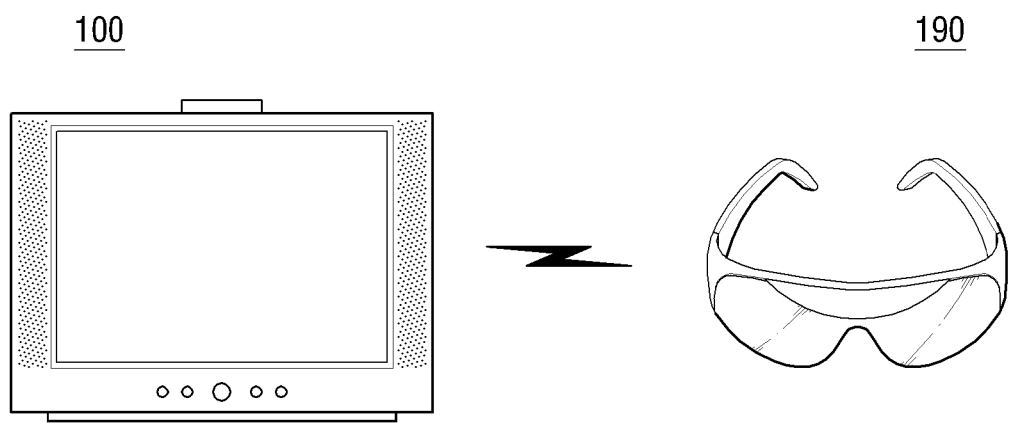
FIG. 1 is a view illustrating a 3D television receiver (TV) according to an exemplary embodiment of the present invention.

Exemplary embodiments of the present invention will now be described in detail with reference to the annexed drawings. In the drawings, the same elements are denoted by the same reference numerals throughout the drawings. In the following description, detailed descriptions of known functions and configurations incorporated herein have been omitted for conciseness and clarity.

FIG. 1 is a view illustrating a 3D television receiver (TV) 100 according to an exemplary embodiment of the present invention. As illustrated in FIG. 1, the 3D TV 100 is communicable with glasses 190.

The 3D TV 100 generates and alternately displays a left-eye image and a right-eye image. A user can view a 3D stereoscopic image through an alternate viewing of the left-eye image and the right-eye image with left eye and right eye, respectively, using the glasses 190.

Specifically, the 3D TV 100 generates the left-eye image and the right-eye image, and alternately displays the left-eye image and the right-eye image on a screen at predetermined time intervals.

Then, the 3D TV 100 generates and transmits a sync signal for the generated left-eye image and right-eye image to the glasses 190.

The glasses 190 receive the sync signal transmitted from the 3D TV 100, and alternately open a left-eye lens and a right-eye lens in synchronization with the left-eye image and the right-eye image.

As described above, a viewer can view the 3D image using the 3D TV 100 and the glasses 190.

Figure 2:
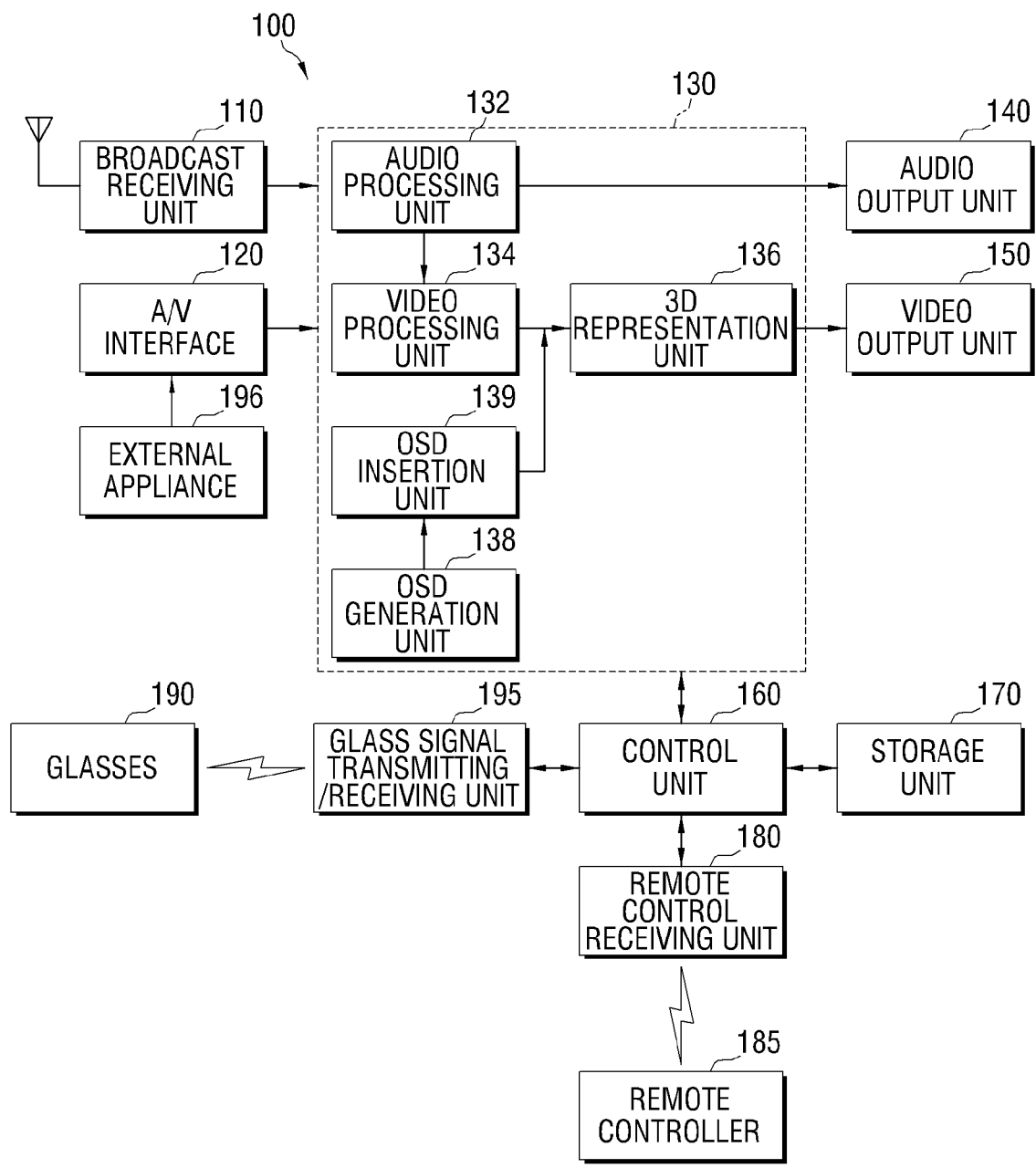
FIG. 2 is a block diagram illustrating the detailed configuration of a 3D TV according to an exemplary embodiment of the present invention.

FIG. 2 is a block diagram illustrating the detailed configuration of a 3D TV according to an exemplary embodiment of the present invention. As illustrated in FIG. 2, the 3D TV 100 includes a broadcast receiving unit 110, an audio/video (A/V) interface 120, an A/V processing unit 130, an audio output unit 140, a video output unit 150, a control unit 160, a storage unit 170, a remote control receiving unit 180, a remote controller 185, and a glass signal transmitting/receiving unit 195.

The broadcast receiving unit 110 receives a broadcasting signal from a broadcasting station or a satellite by wire or wirelessly, and demodulates the received broadcasting signal. The broadcast receiving unit 110 may receive a 3D image signal including 3D image data.

The A/V interface 120 is connected to an external appliance 196, and receives an image from the external appliance. In particular, the A/V interface 120 can receive 3D image data from the external appliance. The A/V interface 120 may perform interfacing of S-Video, component, composite, D-Sub, DVI, HDMI, and the like.

Here, the 3D image data means data including 3D image information. The 3D image data includes left-eye image data and right-eye image data in one data frame region. The 3D image data may be classified in accordance with the types of inclusion of the left-eye image data and the right-eye image data.

FIGS. 8A through 8F are views illustrating various types of 3D image data according to an exemplary embodiment of the present invention.

Figure 8A:
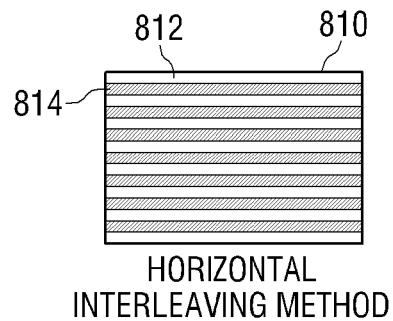
FIGS. 8A, 8B, 8C, 8D, 8E, and 8F are views illustrating various types of 3D image data according to an exemplary embodiment of the present invention.
Figure 8B:
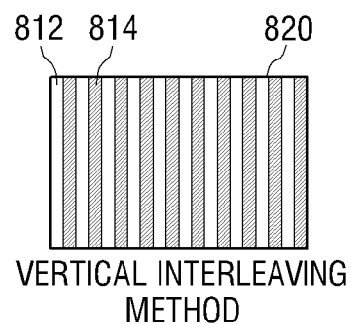
Figure 8C:
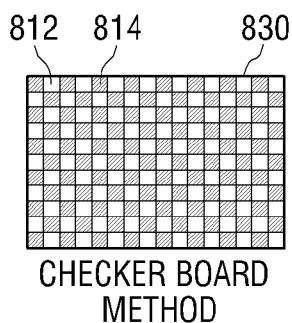

FIGS. 8A, 8B, and 8C illustrate 3D image data including interleaving type left-eye image data and right-eye image data. Examples of the interleaving type may include a horizontal interleaving type 810 (FIG. 8A), a vertical interleaving type 820 (FIG. 8B), and a checker board type 830 (FIG. 8C).

In the 3D image data of the horizontal interleaving type 810, the left-eye image data 812 and the right-eye image data 814 are alternately arranged in the unit of a pixel row. In the 3D image data of the vertical interleaving type 820, the left-eye image data 812 and the right-eye image data 814 are alternately arranged in the unit of a pixel column. In the 3D image data of the checker board type 830, the left-eye image data 812 and the right-eye image data 814 are alternately arranged in the unit of a pixel or in the unit of a square block that includes a plurality of pixels.

Figure 8D:
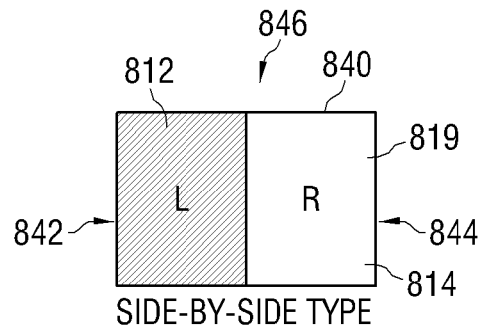
Figure 8E:
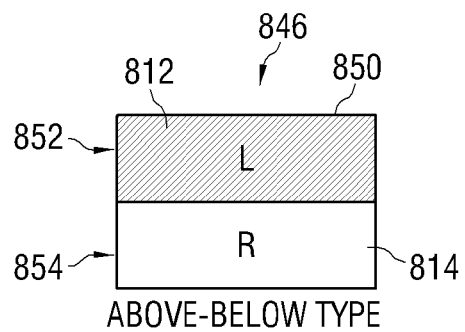
Figure 8F:
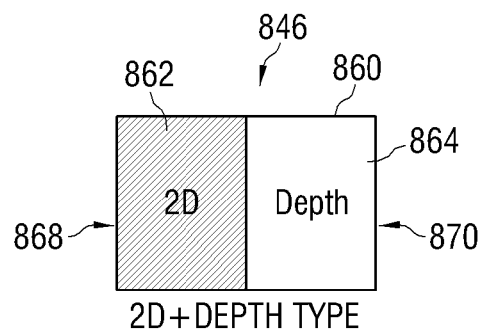

FIGS. 8D, 8E, and 8F illustrate split type 3D image data including left-eye image data 812 and right-eye image data 814. Examples of the split type may include a side-by-side type 840 (FIG. 8D) and an above-below type 850 (FIG. 8E). The split type may further include a 2D+depth type 860, of which the 3D image data includes 2D image data 862 and depth data 864 (FIG. 8F).

The 3D image data of the side-by-side type 840 includes the left-eye image data 812 and the right-eye image data 814 included in a left data region 842 and a right data region 844 of a frame data region 846, respectively. As illustrated in FIG. 8D, one frame data region is divided into the left data region and the right data region, and the left-eye image data is included in the left data region, while the right-eye image data is included in the right data region.

The 3D image data of the above-below type 850 includes the left-eye image data 812 and the right-eye image data 814 included in an upper data region 852 and a lower data region 854 of a frame data region 846, respectively. As illustrated in FIG. 8E, one frame data region 846 is divided into the upper data region and the lower data region, and the left-eye image data is included in the upper data region, while the right-eye image is included in the lower data region.

The 3D image data of the 2D+depth type 860 includes 2D image data 862 to be displayed on the screen and depth data 864 indicating depth information of respective parts of the 2D image data. As illustrated in FIG. 8F, one frame data region 846 is divided into a left data region 868 and a right data region 870. The 2D image data is included in the left data region, while the depth data is included in the right data region. In other words, in the 3D image data of the 2D+depth type 860, a frame data region is divided into left and right data regions, and the 2D image data and the depth data included in the left and right data regions, respectively.

As described above, the 3D image data includes the left-eye image data and the right-eye image data. The 2D image data and the depth data are included in the frame data region to transmit the 3D image using the data format for transmitting the 2D image as is.

Referring again to FIG. 2, the A/V processing unit 130 performs signal processing, such as video decoding, video scaling, audio decoding, and the like, with respect to input image and audio signals, and also performs OSD generation and insertion.

In the case where the input image and audio signals are stored in the storage unit 170, the A/V processing unit 130 compresses the input image and audio signals to store the image and audio signals in a compressed form.

As illustrated in FIG. 2, the A/V processing unit 130 includes an audio processing unit 132, a video processing unit 134, a 3D representation unit 136, an OSD generation unit 138, and an OSD insertion unit 139.

The audio processing unit 132 performs a signal process, such as audio decoding, with respect to the input audio signal, and outputs the processed audio signal to an audio output unit 140.

The video processing unit 134 performs a signal process, such as video decoding, video scaling, and the like, with respect to the input image signal. If the 3D image data is input, the video processing unit 134 outputs the input 3D image data to the 3D representation unit 136.

The 3D representation unit 136 generates a left-eye image and a right-eye image interpolated with a size of one frame using the input 3D image data. That is, the 3D representation unit 136 generates the left-eye image and the right-eye image to be displayed on the screen to represent the 3D stereoscopic image.

Specifically, the 3D representation unit 136 separates the input 3D image data into the left-eye image and the right-eye image. Since one frame data includes the left-eye image and the right-eye image, the separated left-eye image data or right-eye image data corresponds to a half of the whole screen size. Accordingly, the 3D representation unit 136 generates the left-eye image and the right-eye image to be displayed on the screen having the whole screen size by twice enlarging or interpolating the left-eye image data and the right-eye image data.

The 3D representation unit 136 alternately outputs the generated left-eye image and right-eye image to the video output unit 150 to alternately display the left-eye image and the right-eye image.

The OSD generation unit 138 generates an OSD to be displayed to the user. In the case of generating an OSD to be displayed on the 3D image, the OSD generation unit 138 generates a reduced OSD that is smaller than the OSD to be displayed on the 2D image.

In general, the OSD has a 2D form. Accordingly, if the OSD is inserted into the input 3D image in the conventional method, the OSD is abnormally displayed when the 3D image is displayed. This feature is described with reference to FIGS. 9A to 9C.

Figure 9A:
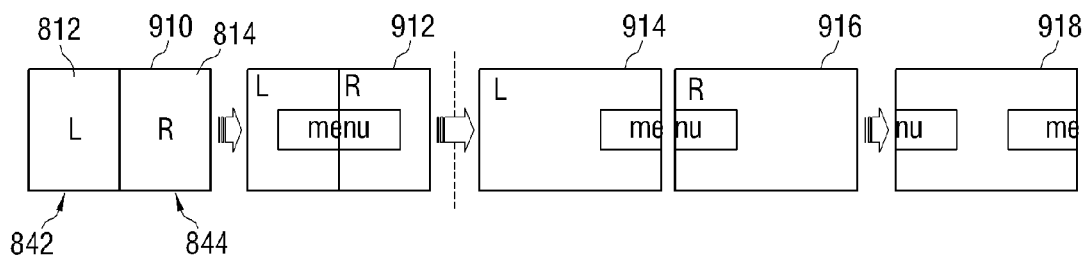
FIGS. 9A, 9B, and 9C are views explaining an abnormal display of an OSD in the case where the OSD is inserted into a 3D image.
Figure 9B:
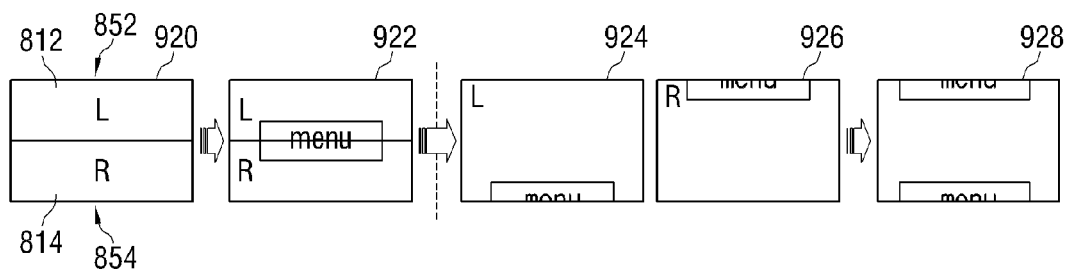
Figure 9C:
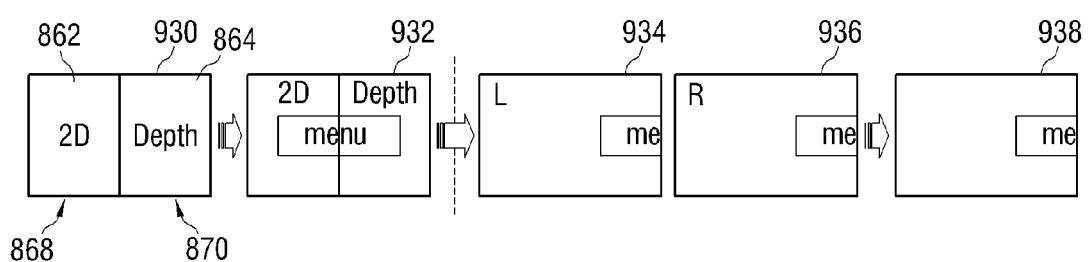

FIGS. 9A to 9C are views explaining an abnormal display of an OSD in the case where the OSD is inserted into a 3D image.

FIG. 9A illustrates a case that a side-by-side type 3D image data is input. As illustrated in FIG. 9A, the input side-by-side type 3D image data 910 includes left-eye image data 812 included in a left data region 842 and right-eye image data 814 included in a right data region 844.

The OSD is inserted into the 3D image data 910, and the 3D image data 912, into which the OSD has been inserted, is outputted. The 3D representation unit 136 divides the 3D image data 912, into which the OSD has been inserted, into the left-eye image data and the right-eye image data, and interpolates or enlarges the separated left-eye image data and right-eye image data in a horizontal direction to generate a left-eye image 914 and a right-eye image 916.

In this case, since the 3D image data 912, into which the OSD has been inserted, is separated in a state that an OSD menu is included with the same size as that of the OSD being displayed on the 2D image, the OSD menu is cut in half, and included in the left-eye image 914 and the right-eye image 916.

The 3D TV 100 alternately displays the left-eye image 914 and the right-eye image 916, and thus the user recognizes that the 3D image 918, in which the OSD menu is cut and separated in a horizontal direction, is displayed.

FIG. 9B illustrates a case that an above-below type 3D image data is input. As illustrated in FIG. 9B, the input above-below type 3D image data 920 includes left-eye image data 812 included in an upper data region 852 and right-eye image data 814 included in a lower data region 854.

The OSD is inserted into the 3D image data 920. The 3D image data 922, into which the OSD has been inserted, is outputted. The 3D representation unit 136 divides the 3D image data 922, into which the OSD has been inserted, into the left-eye image data and the right-eye image data, and interpolates or enlarges the separated left-eye image data and right-eye image data in a vertical direction to generate a left-eye image 924 and a right-eye image 926.

In this case, since the 3D image data 922, into which the OSD has been inserted, is separated in a state that an OSD menu is included with the same size as that of the OSD being displayed on the 2D image, the OSD menu is cut in half, and included in the left-eye image 924 and the right-eye image 926.

The 3D TV 100 alternately displays the left-eye image 924 and the right-eye image 926, and thus the user recognizes that the 3D image 928, in which the OSD menu is cut and separated in a vertical direction, is displayed.

FIG. 9C illustrates a case that a 2D+depth type 3D image data is input. As illustrated in FIG. 9C, the input 2D+depth type 3D image data 930 includes 2D image data 862 included in a left data region 868 and depth data 864 included in a right data region 870.

The OSD is inserted into the 3D image data 930. The 3D image data 932, into which the OSD has been inserted, is outputted. The 3D representation unit 136 divides the 3D image data 932, into which the OSD has been inserted, into the 2D image data and the depth data, and generates a left-eye image 934 and a right-eye image 936 using the 2D image data and the depth data.

In this case, since the 3D image data 932, into which the OSD has been inserted, is separated in a state that an OSD menu is included with the same size as that of the OSD being displayed on the 2D image, only a part of the OSD menu included in the 2D image data is included in the left-eye image 934 and the right-eye image 936.

The 3D TV 100 alternately displays the left-eye image 934 and the right-eye image 936, and thus the user recognizes that the 3D image 938, in which only a half of the OSD menu is included, is displayed.

As described above, if the OSD displayed in the 2D image is inserted into the 3D image data as is, the OSD is abnormally displayed. Accordingly, in an exemplary embodiment of generating the OSD to be displayed on the 3D image, the OSD generation unit 138 generates a reduced OSD that is smaller than the OSD displayed in the 2D image.

Specifically, in the case where the input 3D image data includes the left-eye image data and the right-eye image data, the OSD generation unit 138 generates the OSD through reduction of the size of the OSD to correspond to an image size of the left-eye image data or the right-eye image data.

For example, where the input 3D image data is of a side-by-side type and includes the left-eye image data and the right-eye image data included in a left data region and a right data region of a frame data region, respectively, the OSD generation unit 138 generates the OSD through reduction of the size of the OSD in a horizontal direction. For example, if the size of the OSD is reduced by a half in the horizontal direction, the OSD will have its original size when the 3D representation unit 136 generates the left-eye image and the right-eye image.

Where the input 3D image data is an above-below type and includes the left-eye image data and the right-eye image data included in an upper data region and a lower data region of a frame data region, respectively, the OSD generation unit 138 generates the OSD through reduction of the size of the OSD in a vertical direction. For example, if the size of the OSD is reduced by a half in the vertical direction, the OSD will have its original size when the 3D representation unit 136 generates the left-eye image and the right-eye image.

Where the input 3D image data is a 2D+depth type and includes the 2D image data and the depth data, the OSD generation unit 138 generates the OSD through reduction of the size of the OSD in proportion to the size of the 2D image data. If the size of the OSD is reduced by a half in the horizontal or vertical direction, the OSD will have its original size when the 3D representation unit 136 generates the left-eye image and the right-eye image.

The OSD generation unit 138 may generate the OSD through reduction of the size of the OSD in both the horizontal and vertical directions, irrespective of the type of the input 3D image data. For example, if the size of the OSD is reduced by ¼, it will be ½ of its original size when the 3D representation unit 136 generates the left-eye image and the right-eye image. As described above, if the OSD is reduced in both the horizontal and vertical directions, i.e., if the OSD is reduced by ¼, the generated OSD can be inserted into the 3D image data without the necessity of judging whether the 3D image data is of the side-by-side type or of the above-below type.

As described above, the OSD generation unit 138 generates a reduced OSD that is smaller than the OSD displayed on the 2D image, and thus the OSD menu is prevented from being displayed in a state that it is cut in half.

The OSD insertion unit 139 inserts the generated OSD into the input 3D image data before the 3D image data is input to the 3D representation unit. Accordingly, to the 3D representation unit 136, the 3D image data, into which the OSD has been inserted, is input.

Specifically, the OSD insertion unit 139 inserts the generated OSD into at least one of the left-eye image data and the right-eye image data. Even if the OSD is inserted into only one of the left-eye image data and the right-eye image data, the left-eye image and the right-eye image are alternately displayed, and thus the user recognizes that the OSD is continuously displayed on the screen together with the 3D image.

Where the input 3D image data is of the 2D+depth type that includes the 2D image data and the depth data, the OSD insertion unit 139 inserts the generated OSD into the 2D image data.

Where the OSD generation unit 138 generates the OSD through reduction of the OSD in both the horizontal and vertical directions, the OSD insertion unit 139 inserts the generated OSD into one of the image data regions, which corresponds to one of four-divided screen regions that is positioned on a left upper part of the screen. The details of this feature is described below with reference to FIGS. 11A and 11B.

Figure 6:
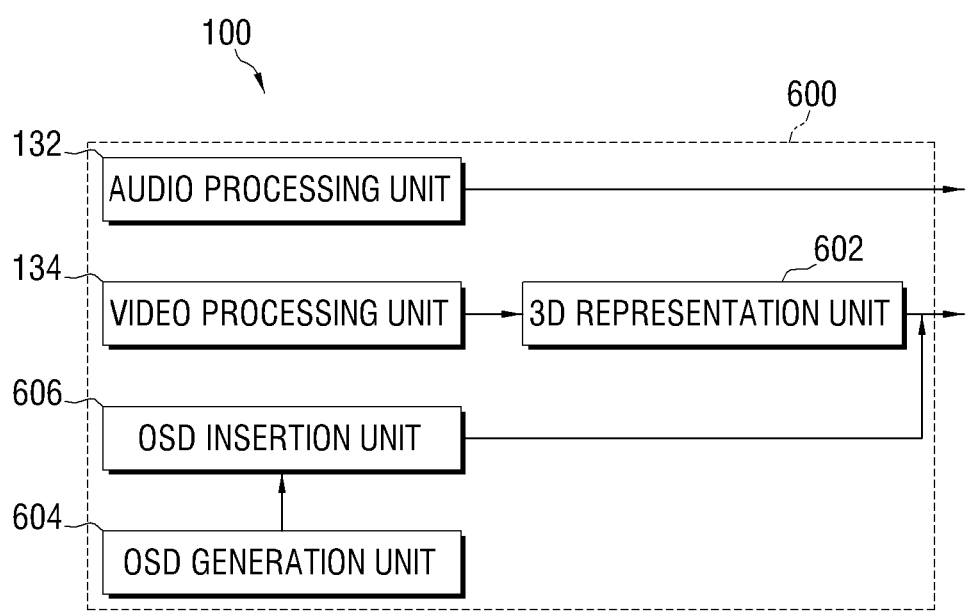
FIG. 6 is a view illustrating the configuration of an A/V processing unit of a 3D TV, which generates and inserts the OSD after 3D representation according to another exemplary embodiment of the present invention.

The OSD insertion unit 139 may be implemented to insert the OSD into both the left-eye image and the right-eye image generated by the 3D representation unit 136 as illustrated in FIG. 6. The left-eye image or the right-eye image generated by the 3D representation unit 136 is an interpolated or enlarged image having a size of the whole screen. Accordingly, if the OSD insertion unit 139 inserts the OSD into both the left-eye image and the right-eye image generated by the 3D representation unit 136, the OSD is normally displayed on the 3D screen.

The audio output unit 140 outputs an audio signal transmitted from the A/V processing unit 130 to a speaker.

The video output unit 150 outputs an image signal transmitted from the A/V processing unit 130 to display the image on the screen. In the case of the 3D image, the video output unit 150 alternately outputs the left-eye image and the right-eye image to display the 3D image on the screen.

The storage unit 170 stores the image received from the broadcast receiving unit 110 or the interface 120. The storage unit 170 may be implemented by a hard disk, a non-volatile memory, and the like.

The remote control receiving unit 180 receives user's key manipulation signal from the remote controller 185, and transmits the received key manipulation signal to the control unit 160.

The glass signal transmitting/receiving unit 195 transmits a clock signal for alternately opening the left-eye glass and the right-eye glass of the glasses 190, and the glasses 190 alternately open the left-eye glass and the right-eye glass in accordance with the received clock signal. Also, the glass signal transmitting/receiving unit 195 receives status information and the like from the glasses 190.

The control unit 160 grasps a user command based on the user's key manipulation signal, and controls the whole operation of the TV in accordance with the user command.

If the 3D image data is input, the control unit 160 controls the 3D TV 100 to operate in a 3D image display mode. Here, the 3D image display mode means a mode that is set when the 3D image is input.

When the 3D TV 100 operates in the 3D image display mode, the 3D representation unit 136 is activated, and the OSD generation unit 138 generates a reduced OSD that is smaller than the OSD being displayed on the 2D image.

In an exemplary embodiment of the present invention, if the OSD is activated while the 3D TV 100 operates in the 3D image display mode, the control unit 160 operates to change the display mode of the 3D TV from the 2D image display mode to a 2D image display mode.

Here, the 2D image display mode means a mode in which the 3D TV 100 displays the 2D image. If the 3D TV 100 is set to the 2D image display mode, the 3D representation unit 136 is inactivated, and the OSD generation unit 138 generates the OSD with its original size.

If a request for an OSD display is input during the display of the 3D image, the control unit 160 changes the display mode of the 3D TV to the 2D image display mode to display the OSD with its original size. In this case, the input image corresponds to the 3D image data, the input 3D image, except for the OSD, is displayed as is. However, in the case where the request for an OSD display is input, the user concentrates his/her attention on the OSD, it is no hindrance that an abnormal background image is displayed. Accordingly, using the above-described method, the OSD can be normally displayed. The details of the above-described method is described later with reference to FIGS. 7 and 13A to 13C.

As described above, the user can use the normally displayed OSD using the 3D TV 100.

A method of providing an OSD in a 3D video apparatus according to an exemplary embodiment of the present invention is described in detail below.

Figure 3:
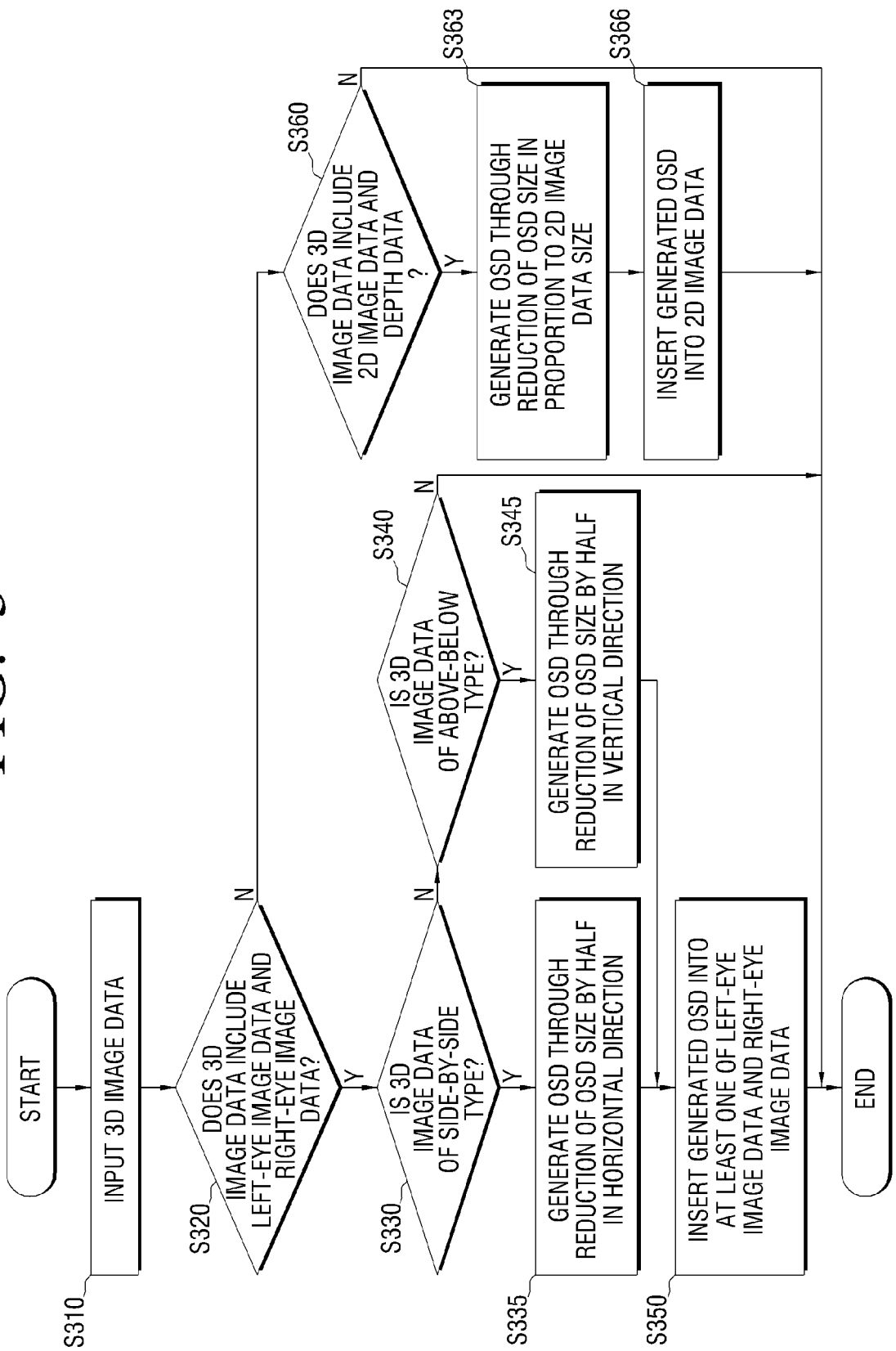
FIG. 3 is a flowchart illustrating a method of providing an OSD in the case where 3D image data includes left-eye image data and right-eye image data, or 3D image data includes 2D image data and depth data, according to an exemplary embodiment of the present invention.

With reference to FIGS. 3 and 10A to 10G, the method of providing an OSD according to an exemplary embodiment of the present invention is described. FIG. 3 is a flowchart illustrating a method of providing an OSD in the case where 3D image data includes left-eye image data and right-eye image data, or 3D image data includes 2D image data and depth data, according to an exemplary embodiment of the present invention.

The 3D TV 100 receives the 3D image data (S310). The 3D TV then judges whether the input 3D image data includes left-eye image data and right-eye image data (S320).

If the input 3D image data includes the left-eye image data and the right-eye image data (320-Y), the 3D TV 100 judges whether the 3D image data is of a side-by-side type (S330).

If the 3D image data is of a side-by-side type (S330-Y), the 3D TV 100 generates an OSD through reduction of the size of the OSD by half in a horizontal direction (S335). The 3D TV 100 may generates the OSD through reduction of the size of the OSD to correspond to an image size of the left-eye image data or the right-eye image data, instead of reducing the size of the OSD by half in the horizontal direction.

The 3D TV 100 inserts the generated OSD into at least one of the left-eye image data and the right-eye image data (S350).

If the 3D image data is of an above-below type (S340-Y), the 3D TV 100 generates the OSD through reduction of the size of the OSD by half in a vertical direction (S345). The 3D TV 100 may generate the OSD through reduction of the size of the OSD to correspond to the image size of the left-eye image data or the right-eye image data, instead of reducing the size of the OSD by the half in the vertical direction.

The 3D TV 100 inserts the generated OSD into at least one of the left-eye image data and the right-eye image data (S350).

Where the 3D image data is a 2D+depth type and includes 2D image data and depth data (S360-Y), the 3D TV 100 generates the OSD through reduction of the size of the OSD in proportion to the size of the 2D image data (S363). The 3D TV 100 inserts the generated OSD into the 2D image data (S366).

The 3D TV 100 generates the left-eye image and the right-eye image using the 3D image into which the OSD has been inserted, and alternately outputs the left-eye image and the right-eye image to display the 3D image. Also, the 3D TV 100 generates the OSD through reduction of the size of the OSD in proportion to the image size of the left-eye image data or the right-eye image data, and thus the OSD can be normally displayed on the 3D image without being cut in half.

Figure 10A:
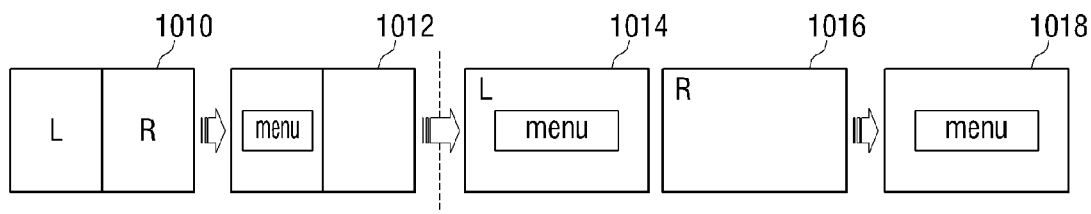
FIGS. 10A, 10B, 10C, 10D, 10E, 10F, and 10G are views explaining a method of displaying an OSD through generation and insertion of a reduced OSD according to an exemplary embodiment of the present invention.
Figure 10B:
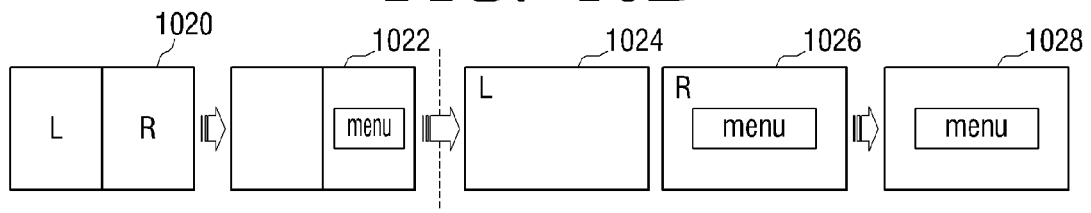
Figure 10C:
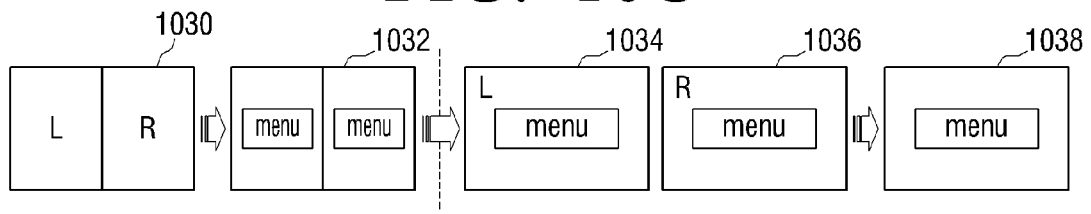

A method of providing an OSD according to an exemplary embodiment of the present invention is described in detail with reference to FIGS. 10A to 10C. FIGS. 10A to 10C are views explaining a method of displaying an OSD through generation and insertion of a reduced OSD according to the exemplary embodiment of the present invention.

FIGS. 10A, 10B, and 10C illustrate methods of displaying an OSD through generation and insertion of a reduced OSD in the case where the 3D image data 1010 is a side-by-side type. As illustrated in FIG. 10A, the input 3D image data 1010 of the side-by-side type includes the left-eye image data included in the left data region and the right-eye image data included in the right data region.

Since the 3D image data 1010 is the side-by-side type, the OSD generation unit 138 generates the OSD through reduction of the size of the OSD so that the image region corresponding to the OSD is included in the image region corresponding to the left-eye image data. The OSD insertion unit 139 inserts the reduced OSD into the left-eye image data of the 3D image data 1010.

The 3D representation unit 136 divides the 3D image data 1012 including the left-eye image data, into which the OSD has been inserted, into the left-eye image data and the right-eye image data, and enlarges or interpolates the left-eye image data and the right-eye image data in the horizontal direction to generate a left-eye image 1014 and a right-eye image 1016 having a size of the whole screen. Here, it can be confirmed that the normal OSD menu is included in the left-eye image 1014.

As the 3D TV 100 alternately displays the left-eye image 1014 and the right-eye image 1016 as described above, the user can recognize a 3D image 1018 on which the OSD menu is normally displayed. Although the OSD is displayed only when the left-eye image 1014 is displayed, the left-eye image 1014 and the right-eye image 1016 are alternately displayed, and thus the user can recognize that the normal OSD is continuously displayed together with the 3D image 1018.

Referring to FIG. 10B, the OSD insertion unit 139 may insert the reduced OSD into the right-eye image data of the 3D image data 1020.

The 3D representation unit 136 divides the 3D image data 1022 including the left-eye image data, into which the OSD has been inserted, into the left-eye image data and the right-eye image data, and enlarges or interpolates the left-eye image data and the right-eye image data in the horizontal direction to generate a left-eye image 1024 and a right-eye image 1026 having a size of the whole screen. Here, it can be confirmed that the normal OSD menu is included in the right-eye image 1026.

As the 3D TV 100 alternately displays the left-eye image 1024 and the right-eye image 1026 as described above, the user can recognize a 3D image 1028 on which the OSD menu is normally displayed. Although the OSD is displayed only when the right-eye image 1026 is displayed, the left-eye image 1024 and the right-eye image 1026 are alternately displayed, and thus the user can recognize that the normal OSD is continuously displayed together with the 3D image 1028.

Referring to FIG. 10C, the OSD insertion unit 139 may insert the reduced OSD into the left-eye image data and the right-eye image data of the 3D image data 1030.

The 3D representation unit 136 divides the 3D image data 1032, into which the OSD has been inserted, into the left-eye image data and the right-eye image data, and enlarges or interpolates the left-eye image data and the right-eye image data in the horizontal direction to generate a left-eye image 1034 and a right-eye image 1036 having a size of the whole screen. Here, it can be confirmed that the normal OSD menu is included in the left-eye image 1034 and the right-eye image 1036.

As the 3D TV 100 alternately displays the left-eye image 1034 and the right-eye image 1036 as described above, the user can recognize a 3D image 1038 on which the OSD menu is normally displayed.

As described above, in the case where the 3D image data 1010 is of the side-by-side type, the OSD is generated through reduction of the OSD in the horizontal direction, and thus a normal OSD can be displayed on the 3D image.

Figure 10D:
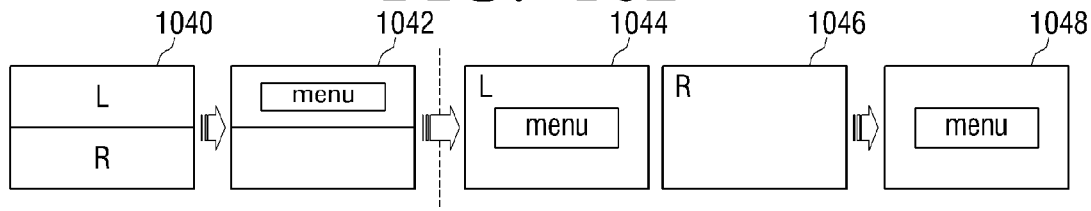
Figure 10E:
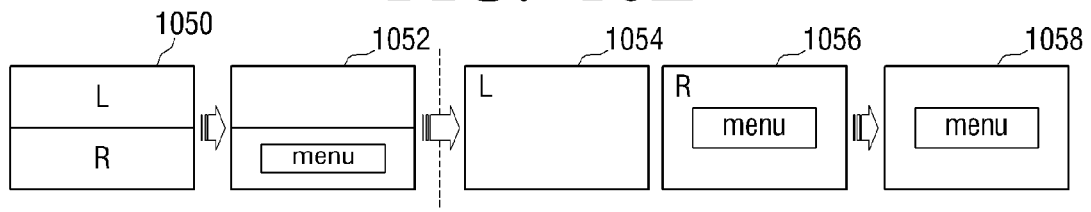
Figure 10F:
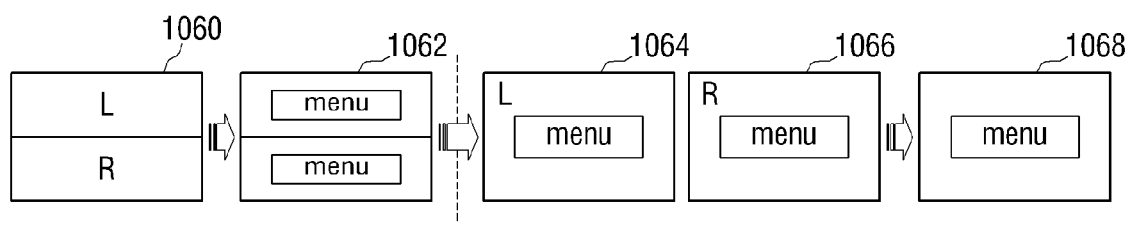

FIGS. 10D, 10E, and 10F illustrate methods of displaying an OSD through generation and insertion of a reduced OSD in the case where the 3D image data 1040 is of an above-below type. As illustrated in FIG. 10D, the input 3D image data 1040 of the above-below type includes the left-eye image data included in the upper data region and the right-eye image data included in the lower data region.

Since the 3D image data 1040 is of the above-below type, the OSD generation unit 138 of the 3D TV 100 generates the OSD through reduction of the size of the OSD so that the image region corresponding to the OSD is included in the image region corresponding to the left-eye image data. The OSD insertion unit 139 inserts the reduced OSD into the left-eye image data of the 3D image data 1040.

The 3D representation unit 136 divides the 3D image data 1042 including the left-eye image data, into which the OSD has been inserted, into the left-eye image data and the right-eye image data, and enlarges or interpolates the left-eye image data and the right-eye image data in the vertical direction to generate a left-eye image 1044 and a right-eye image 1046 having a size of the whole screen. Here, it can be confirmed that the normal OSD menu is included in the left-eye image 1044.

As the 3D TV 100 alternately displays the left-eye image 1044 and the right-eye image 1046 as described above, the user can recognize a 3D image 1048 on which the OSD menu is normally displayed. Although the OSD is displayed only when the left-eye image 1044 is displayed, the left-eye image 1044 and the right-eye image 1046 are alternately displayed, and thus the user can recognize that the normal OSD is continuously displayed together with the 3D image 1048.

Referring to FIG. 10E, the OSD insertion unit 139 may insert the reduced OSD into the right-eye image data of the 3D image data 1050.

The 3D representation unit 136 divides the 3D image data 1052 including the left-eye image data, into which the OSD has been inserted, into the left-eye image data and the right-eye image data, and enlarges or interpolates the left-eye image data and the right-eye image data in the vertical direction to generate a left-eye image 1054 and a right-eye image 1056 having a size of the whole screen. Here, it can be confirmed that the normal OSD menu is included in the right-eye image 1056.

As the 3D TV 100 alternately displays the left-eye image 1054 and the right-eye image 1056 as described above, the user can recognize a 3D image 1058 on which the OSD menu is normally displayed. In this case, although the OSD is displayed only when the right-eye image 1056 is displayed, the left-eye image 1054 and the right-eye image 1056 are alternately displayed, and thus the user can recognize that the normal OSD is continuously displayed together with the 3D image 1058.

Referring to FIG. 10F, the OSD insertion unit 139 may insert the reduced OSD into both the left-eye image data and the right-eye image data of the 3D image data 1060.

The 3D representation unit 136 divides the 3D image data 1062, into which the OSD has been inserted, into the left-eye image data and the right-eye image data, and enlarges or interpolates the left-eye image data and the right-eye image data in the vertical direction to generate a left-eye image 1064 and a right-eye image 1066 having a size of the whole screen. Here, it can be confirmed that the normal OSD menu is included in the left-eye image 1064 and the right-eye image 1066.

As the 3D TV 100 alternately displays the left-eye image 1064 and the right-eye image 1066 as described above, the user can recognize a 3D image 1068 on which the OSD menu is normally displayed.

As described above, in the case where the 3D image data 1040 is of the above-below type, the OSD is generated through reduction of the OSD in the vertical direction, and thus a normal OSD can be displayed on the 3D image.

Figure 10G:
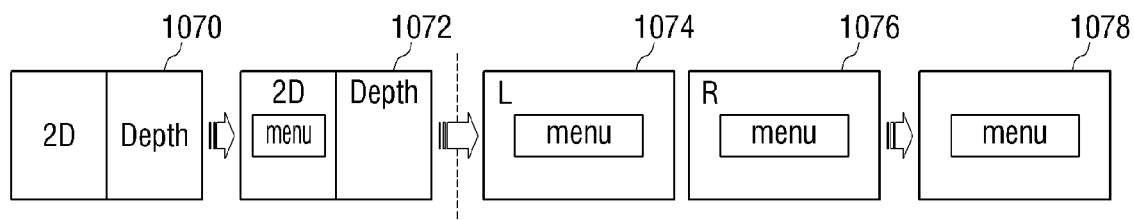

FIG. 10G is a view explaining a method of displaying an OSD through generation and insertion of a reduced OSD in the case where the 3D image data 1070 is of a 2D+depth type. As illustrated in FIG. 10G, the input 3D image data 1070 of the 2D+depth type includes the 2D image data included in the left data region and the depth data included in the right data region.

The OSD generation unit 138 of the 3D TV 100 generates the OSD through reduction of the size of the OSD in proportion to the size of the 2D image data. Here, the OSD is reduced so that the image region corresponding to the OSD is included in the image region corresponding to the 2D image data.

According to the exemplary method illustrated in FIG. 10G, the OSD is generated through the reduction of the OSD in the horizontal direction. The OSD insertion unit 139 inserts the reduced OSD into the 2D image data of the 3D image data 1070.

The 3D representation unit 136 divides the 3D image data 1072 having the 2D image data, into which the OSD has been inserted, into the 2D image data and the depth data, and generates a left-eye image 1074 and a right-eye image 1076 having a size of the whole screen using the 2D image data and the depth data. Here, it can be confirmed that the normal OSD menu is included in the left-eye image 1074 and a right-eye image 1076.

As the 3D TV 100 alternately displays the left-eye image 1074 and the right-eye image 1076 as described above, the user can recognize a 3D image 1078 on which the OSD menu is normally displayed.

As described above, the 3D TV 100 can display the normal OSD on the 3D image using the method of displaying the OSD through generation and insertion of the reduced OSD.

Figure 4:
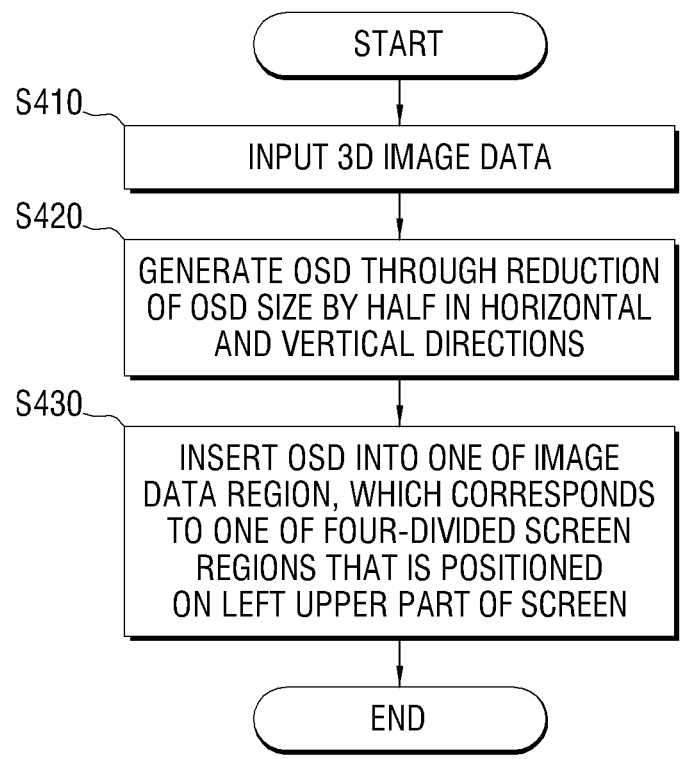
FIG. 4 is a flowchart illustrating a method of providing an OSD, which generates and inserts the OSD through reduction of the OSD by half in both horizontal and vertical directions, according to an exemplary embodiment of the present invention.
Figure 11A:
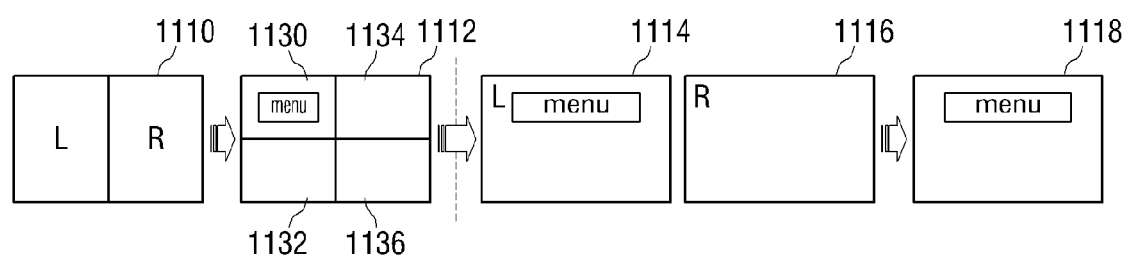
FIGS. 11A and 11B are views explaining a method of generating and inserting an OSD through reduction of the OSD in both horizontal and vertical directions according to another exemplary embodiment of the present invention.
Figure 11B:
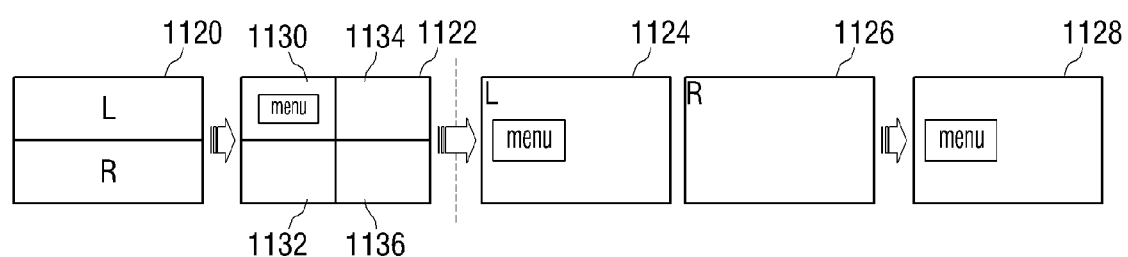

With reference to FIGS. 4, 11A, and 11B, a method of providing an OSD according to another exemplary embodiment of the present invention is described. FIG. 4 is a flowchart illustrating a method of providing an OSD, which generates and inserts the OSD through reduction of the OSD by half in both horizontal and vertical directions, according to the another exemplary embodiment of the present invention.

Referring to FIG. 4, the 3D TV 100 receives the 3D image data (S410). The 3D TV 100 generates the OSD through reduction of the OSD by half in horizontal and vertical directions, irrespective of the types of the input 3D image data (S420). The 3D TV 100 may generate the OSD through reduction of the size of the OSD to correspond to an image size of the left-eye image data or the right-eye image data, instead of reducing the size of the OSD by half in the horizontal and vertical directions.

The 3D TV 100 inserts the generated OSD into one of the input 3D image data regions, which corresponds to one of four-divided screen regions that is positioned on a left upper part of the screen (S430).

The 3D TV 100 generates a left-eye image and a right-eye image using the 3D image data, into which the OSD has been inserted, and alternately outputs the left-eye image and the right-eye image to display the 3D image.

As described above, the 3D TV 100 generates the OSD through reduction of the size of the OSD in the horizontal and vertical directions, and thus the OSD can be normally displayed on the 3D image without being cut in half, irrespective of the type of the input 3D image data.

A method of providing an OSD according to the another exemplary embodiment of the present invention as described above is described in more detail with reference to FIGS. 11A and 11B. FIGS. 11A and 11B are views explaining a method of generating and inserting an OSD through reduction of the OSD in the horizontal and vertical directions according to another exemplary embodiment of the present invention.

FIG. 11A is a view explaining a method of displaying an OSD through generation and insertion of a reduced OSD in the horizontal and vertical directions in the case where the 3D image data 1110 is of a side-by-side type. As illustrated in FIG. 11A, the input 3D image data 1110 of the side-by-side type includes the left-eye image data included in the left data region and the right-eye image data included in the right data region.

The OSD generation unit 138 generates the OSD through reduction of the size of the OSD in both the horizontal and vertical directions. The OSD insertion unit 139 inserts the generated OSD into one of the image data regions, which corresponds to one of four-divided screen regions 1130, 1132, 1134, 1136, for example, into a left upper region 1130. The OSD insertion unit 139 may insert the generated OSD into any one of a left lower region 1132, a right upper region 1134, or a right lower region 1136 instead of or in addition to the left upper region 1130.

The 3D representation unit 136 divides the 3D image data 1112, into which the OSD has been inserted, into the left-eye image data and the right-eye image data, and enlarges or interpolates the left-eye image data and the right-eye image data in the horizontal direction to generate a left-eye image 1114 and a right-eye image 1116 having a size of the whole screen. Here, it can be confirmed that the OSD menu of which the size is reduced by ½ in the vertical direction is included in the left-eye image 1114.

As the 3D TV 100 alternately displays the left-eye image 1114 and the right-eye image 1116 as described above, the user can recognize a 3D image 1118 on which the OSD menu reduced by ½ in the vertical direction is displayed. Although the OSD is displayed only when the left-eye image 1114 is displayed, the left-eye image 1114 and the right-eye image 1116 are alternately displayed, and thus the user can recognize that the OSD reduced by ½ in the vertical direction is continuously displayed together with the 3D image 1118.

FIG. 11B is a view explaining a method of displaying an OSD through generation and insertion of a reduced OSD in the horizontal and vertical directions in the case where the 3D image data 1120 is of an above-below type. As illustrated in FIG. 11B, the input 3D image data 1120 of the above-below type includes the left-eye image data included in the upper data region and the right-eye image data included in the lower data region.

The OSD generation unit 138 generates the OSD through reduction of the size of the OSD in the horizontal and vertical directions. The OSD insertion unit 139 inserts the generated OSD into one of the image data regions, which corresponds to one of four-divided screen regions for example, into the left upper region 1130. The OSD insertion unit 139 may insert the generated OSD into any one of a left lower region 1132, a right upper region 1134, and right lower region 1136 instead of or in addition to the left upper region 1130.

The 3D representation unit 136 divides the 3D image data 1122, into which the OSD has been inserted, into the left-eye image data and the right-eye image data, and enlarges or interpolates the left-eye image data and the right-eye image data in the vertical direction to generate a left-eye image 1124 and a right-eye image 1126 having a size of the whole screen. Here, it can be confirmed that the OSD menu reduced by ½ in the horizontal direction is included in the left-eye image 1124.

As the 3D TV 100 alternately displays the left-eye image 1124 and the right-eye image 1126 as described above, the user can recognize a 3D image 1128 on which the OSD menu reduced by ½ in the horizontal direction is displayed. Although the OSD is displayed only when the left-eye image 1124 is displayed, the left-eye image 1124 and the right-eye image 1126 are alternately displayed, and thus the user can recognize that the OSD reduced by ½ in the horizontal direction is continuously displayed together with the 3D image 1128.

As described above, the OSD menu can be displayed on the 3D image using the method of generating and inserting the OSD through reduction of the OSD in both horizontal and vertical directions. In the above-described embodiment of the present invention, the OSD menu, the size of which is reduced by ½ in horizontal or vertical directions, is displayed. The OSD can be displayed without being cut in half, irrespective of the type of the input 3D image data.

Figure 5:
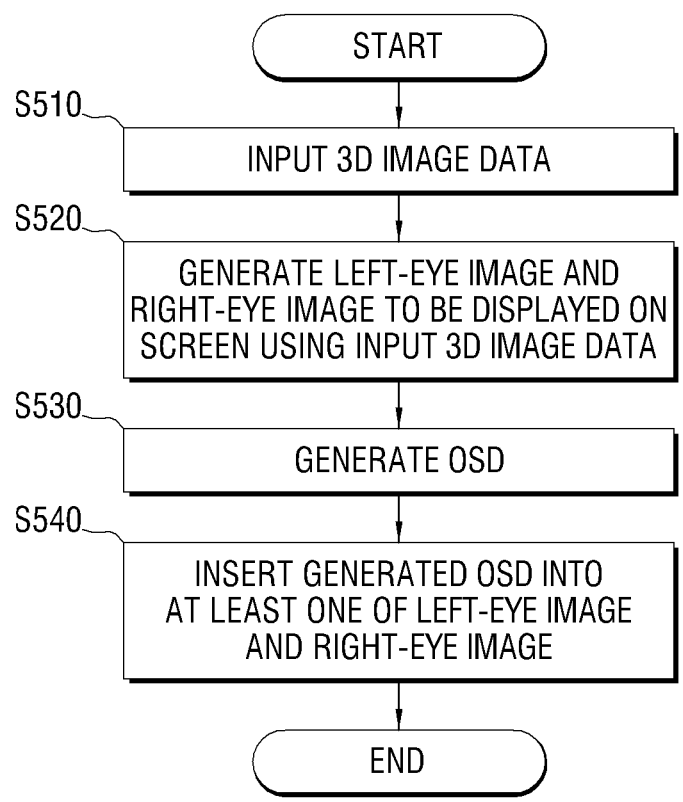
FIG. 5 is a flowchart illustrating a method of providing an OSD, which generates and inserts the OSD after 3D representation, according to another exemplary embodiment of the present invention.

Hereinafter, with reference to FIGS. 5, 6, 12A, 12B and 12C, a method of providing an OSD according to another exemplary embodiment of the present invention is described. FIG. 5 is a flowchart illustrating a method of providing an OSD, which generates and inserts the OSD after the 3D representation, according to another exemplary embodiment of the present invention.

The 3D TV 100 receives the 3D image data (S510). The 3D representation unit 136 of the 3D TV 100 generates a left-eye image and a right-eye image using the input 3D image data (S520). Here, the 3D representation unit 136 divides the input 3D image data into left-eye image data and right-eye image data, enlarges or interpolates the left-eye image data and the right-eye image data to generate a left-eye image and a right-eye image having a size of the whole screen.

The 3D TV 100 generates an OSD to be displayed on the screen (S530), and inserts the generated OSD into at least one of the left-eye image and the right-eye image (S540).

That is, in the exemplary embodiment of the present invention as illustrated in FIG. 5, the 3D TV 100 generates the left-eye image or the right-eye image enlarged or interpolated with a size of the whole screen using the input 3D image data, and then inserts the OSD into the generated left-eye image or right-eye image. Accordingly, even if the OSD is inserted into the 2D image with its original size, the OSD can be normally displayed through the 3D TV 100 without being cut in half.

FIG. 6 is a view illustrating the configuration of an A/V processing unit 600 of the 3D TV 100, which generates and inserts the OSD after the 3D representation according to another embodiment of the present invention. Since the A/V processing unit 600 of FIG. 6 is similar to the A/V processing unit 130 of FIG. 2, duplicate description is omitted, and only differences between them are described.

The A/V processing unit 130 of FIG. 2 is implemented to insert the OSD into the 3D image data outputted from the video processing unit 134. By contrast, the A/V processing unit 600 of FIG. 6 is implemented to insert the OSD into the left-eye image and the right-eye image outputted from the 3D representation unit 602.

Accordingly, the A/V processing unit 600 having the construction as illustrated in FIG. 6 can normally display the OSD on the 3D image through a method illustrated in FIG. 5.

Figure 12A:
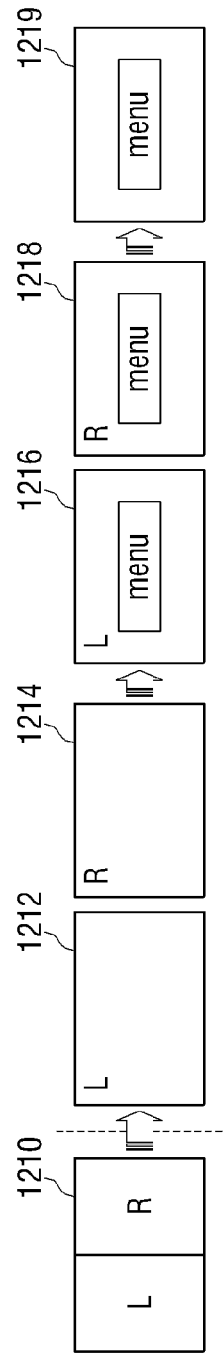
FIGS. 12A, 12B, and 12C are views explaining a method of inserting an OSD after generating a left-eye image and a right-eye image according to still another exemplary embodiment of the present invention.
Figure 12B:
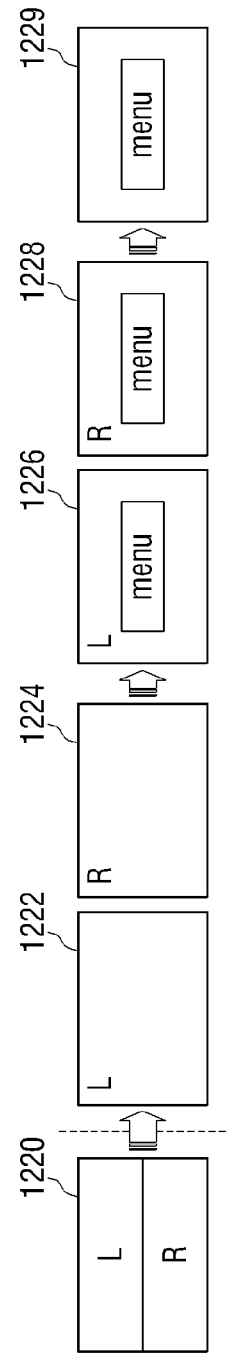
Figure 12C:
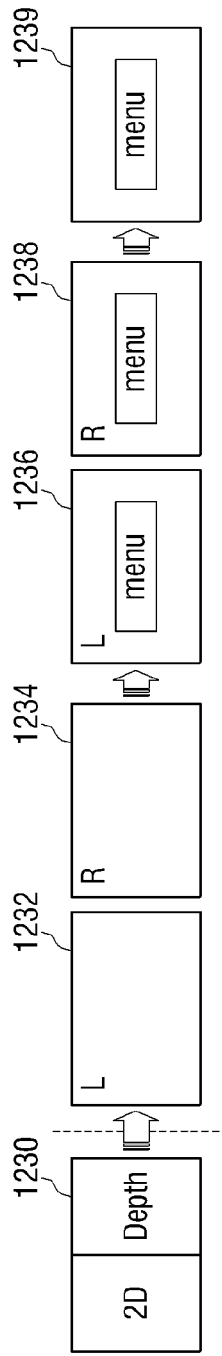

A method of providing an OSD according to another exemplary embodiment of the present invention is described in detail with reference to FIGS. 12A to 12C. FIGS. 12A to 12C are views explaining a method of inserting an OSD after generating a left-eye image and a right-eye image according to another exemplary embodiment of the present invention.

FIG. 12A is a view explaining a method of displaying an OSD through generation and insertion of an OSD into 3D implemented left-eye image and right-eye image in the case where the 3D image data 1210 is of a side-by-side type. As illustrated in FIG. 12A, the input 3D image data 1210 of the side-by-side type includes left-eye image data included in a left data region and right-eye image data included in a right data region.

The 3D representation unit 602 divides the input 3D image data 1210 into the left-eye image data and the right-eye image data, and enlarges or interpolates the left-eye image data and the right-eye image data in the horizontal direction to generate a left-eye image 1212 and a right-eye image 1214 having a size of the whole screen.

The OSD generation unit 604 generates the OSD having the same size as that of the OSD being displayed on the 2D image. The OSD insertion unit 606 inserts the generated OSD into the left-eye image 1212 and the right-eye image 1214. Through the above-described process, a left-eye image 1216, into which the OSD has been inserted, and a right-eye image 1218, into which the OSD has been inserted, can be produced.

As the 3D TV 100 alternately displays the left-eye image 1216 including the OSD and the right-eye image 1218 including the OSD, the user can recognize a 3D image 1219 on which a normal OSD menu is displayed.

FIG. 12B is a view explaining a method of displaying an OSD through generation and insertion of an OSD into 3D implemented left-eye image and right-eye image in the case where the 3D image data 1220 is of a above-below type. As illustrated in FIG. 12B, the input 3D image data 1220 of the above-below type includes left-eye image data included in an upper data region and right-eye image data included in a lower data region.

The 3D representation unit 602 of the 3D TV 100 divides the input 3D image data 1220 into the left-eye image data and the right-eye image data, and enlarges or interpolates the left-eye image data and the right-eye image data in the vertical direction to generate a left-eye image 1222 and a right-eye image 1224 having a size of the whole screen.

The OSD generation unit 604 generates the OSD having the same size as that of the OSD being displayed on the 2D image, and the OSD insertion unit 606 inserts the generated OSD into the left-eye image 1222 and the right-eye image 1224. Through the above-described process, a left-eye image 1226, into which the OSD has been inserted, and a right-eye image 1228, into which the OSD has been inserted, can be produced.

As the 3D TV 100 alternately displays the left-eye image 1226 including the OSD and the right-eye image 1228 including the OSD, the user can recognize a 3D image 1229 on which a normal OSD menu is displayed.

FIG. 12C is a view explaining a method of displaying an OSD through generation and insertion of an OSD into 3D implemented left-eye image and right-eye image in the case where the 3D image data 1230 is of a 2D+depth type. As illustrated in FIG. 12C, the input 3D image data 1230 of the 2D+depth type includes 2D image data included in a left data region and depth data included in a right data region.

The 3D representation unit 602 divides the input 3D image data 1230 into the 2D image data and the depth data, and expresses the depth on the 2D image data using the depth data to generate a left-eye image 1232 and a right-eye image 1234 having a size of the whole screen.

The OSD generation unit 604 generates the OSD having the same size as that of the OSD being displayed on the 2D image, and the OSD insertion unit 606 inserts the generated OSD into the left-eye image 1232 and the right-eye image 1234. Through the above-described process, a left-eye image 1236, into which the OSD has been inserted, and a right-eye image 1238, into which the OSD has been inserted, can be produced.

As the 3D TV 100 alternately displays the left-eye image 1236 including the OSD and the right-eye image 1238 including the OSD, the user can recognize a 3D image 1239 on which a normal OSD menu is displayed.

As described above, according to another exemplary embodiment of the present invention, the 3D TV 100 generates the left-eye image or the right-eye image through the 3D representation, and then inserts the OSD into the generated left-eye image or right-eye image. Accordingly, as illustrated in FIGS. 12A to 12C, the OSD can be normally displayed with respect to diverse types of 3D image data.

A method of providing an OSD according to another exemplary embodiment of the present invention is described in detail with reference to FIGS. 7 and 13A to 13C. FIG. 7 is a flowchart illustrating a method of providing an OSD, which changes a display mode of a 3D video apparatus from a 3D image display mode to a 2D image display mode when the OSD is activated in the 3D image display mode, according to the exemplary embodiment of the present invention.

The 3D TV 100 operates in a 3D image display mode (S710). If the 3D image data is input in a state that the 3D image display mode is set in the 3D TV 100, the 3D TV 100 generates a left-eye image and a right-eye image using the input 3D image data, and alternately displays the left-eye image and the right-eye image to display the 3D image.

In a state that the 3D image display mode is set, the 3D TV 100 judges whether the OSD is activated (S720). The OSD is activated in the case where a user inputs an OSD display request command using an input device such as a remote controller.

If the OSD is activated (S720-Y), the 3D TV 100 changes the present display mode to a 2D image display mode (S730). Then, the 3D TV 100 generates an OSD having the same size as that of the OSD being displayed on the 2D image (S740), and inserts the OSD into the input 3D image data (S750).

The 3D TV 100 displays the 3D image data, into which the OSD has been inserted, in the 2D image display mode (S760). In the case where the 3D TV 100 is set in the 2D image display mode, the 3D TV 100 inactivates the 3D representation unit 136. Accordingly, if the 3D TV 100 is set in the 2D image display mode, the 3D TV 100 does not separate the input 3D image data into a left-eye image and a right-eye image, but displays frame data, which includes left-eye image data and right-eye image data, on the screen as is.

In this case, since the OSD inserted into the 3D image data is displayed as it is, a normal display of the OSD is performed.

Figure 13A:
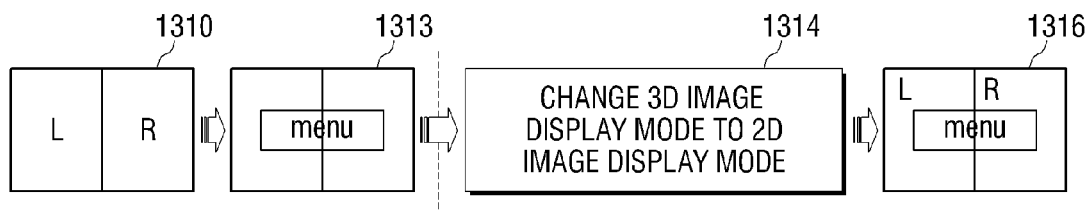
FIGS. 13A, 13B, and 13C are views explaining a method of changing a display mode of a 3D video apparatus from a 3D image display mode to a 2D image display mode if an OSD is activated while a 3D image is displayed according to still another exemplary embodiment of the present invention.
Figure 13B:
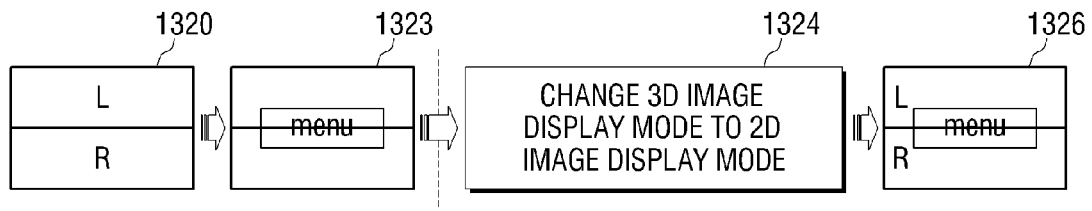
Figure 13C:
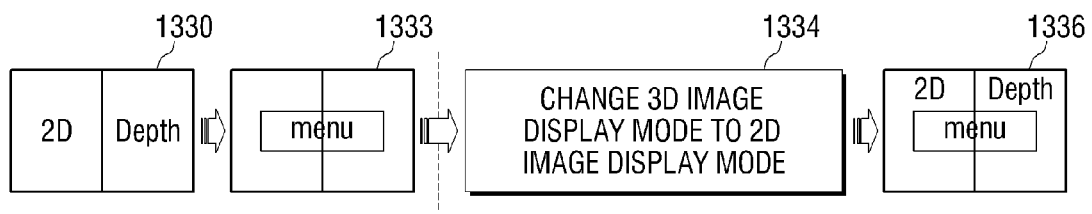

A method of providing an OSD according to an exemplary embodiment of the present invention will be described in detail with reference to FIGS. 13A to 13C. FIGS. 13A to 13C are views explaining a method of changing a display mode of the 3D TV to a 2D image display mode if the OSD is activated while the 3D image is displayed according to the exemplary embodiment of the present invention.

FIG. 13A is a view explaining a method of displaying an OSD by changing the display mode to the 2D image display mode in the case where the input 3D image data 1310 is a side-by-side type. As illustrated in FIG. 13A, the input 3D image data 1310 of the side-by-side type includes left-eye image data included in a left data region and right-eye image data included in a right data region.

If the OSD is activated in a state that the 3D image display mode is set, the OSD generation unit 138 of the 3D TV 100 generates the OSD having the same size as that of the OSD being displayed on the 2D image. Through this process, 3D image data 1313, into which the OSD has been inserted, is produced.

The control unit 160 changes the display mode of the 3D TV 100 from the 3D image display mode to the 2D image display mode (1314).

The 3D TV 100 displays the 3D image data 1313 with the inserted OSD in the 2D image display mode. Accordingly, the 3D image 1316, which includes the left-eye image and the right-eye image divided in the horizontal direction, is displayed on the screen as is. In this case, the OSD is normally displayed without being cut.

FIG. 13B is a view explaining a method of displaying an OSD by changing the display mode to the 2D image display mode in the case where the input 3D image data 1320 is an above-below type. As illustrated in FIG. 13B, the input 3D image data 1320 of the above-below type includes left-eye image data included in an upper data region and right-eye image data included in a lower data region.

If the OSD is activated in a state that the 3D image display mode is set, the OSD generation unit 138 generates the OSD having the same size as that of the OSD being displayed on the 2D image. Through this process, 3D image data 1323, into which the OSD has been inserted, is produced.

The control unit 160 changes the display mode of the 3D TV 100 from the 3D image display mode to the 2D image display mode (1324).

The 3D TV 100 displays the 3D image data 1323 having the inserted OSD in the 2D image display mode. Accordingly, the 3D image 1326, which includes the left-eye image and the right-eye image divided in the vertical direction, is displayed as is. In this case, the OSD is normally displayed without being cut.

FIG. 13C is a view explaining a method of displaying an OSD by changing the display mode to the 2D image display mode where the input 3D image data 1310 is of a 2D+depth type. As illustrated in FIG. 13C, the input 3D image data 1330 of the 2D+depth type includes 2D image data included in a left data region and depth data included in a right data region.

If the OSD is activated in a state that the 3D image display mode is set, the OSD generation unit 138 generates the OSD having the same size as that of the OSD being displayed on the 2D image. Through this process, 3D image data 1333, into which the OSD has been inserted, is produced.

The control unit 160 changes the display mode of the 3D TV 100 from the 3D image display mode to the 2D image display mode (1334).

The 3D TV 100 displays the 3D image data 1333 having the inserted OSD in the 2D image display mode. Accordingly, the 3D image 1336, which includes the 2D image data and the depth data, is displayed on the screen as is. In this case, the OSD is normally displayed without being cut.

According to an exemplary embodiment of the present invention, the input 3D image is abnormally displayed. However, in the case where the OSD is activated, the user concentrates his/her attention on the OSD, and thus it is no hindrance that an abnormal background image is displayed. Accordingly, the OSD can be normally displayed.

In the foregoing description, it is exemplified that the 3D TV 100 is a glasses type. However, it is apparent that the present invention can be applied to other glasses-free type video apparatuses. That is, the present invention can be applied to any type of 3D video apparatuses representing 3D images through generation of left-eye images and right-eye images using 3D image data.

In exemplary embodiments of the present invention, it is exemplified that the 3D video apparatus is the 3D TV 100. However, the present invention can be applied to any apparatus for inserting an OSD into 3D image data. For example, the present invention can be applied to media players, such as a DVD player, an HD-DVD player, a BD player, and the like.

In the case of a 3D video apparatuses for outputting 3D image data, such as a DVD player, which is not a display device such as a TV, the exemplary embodiments of the present invention can be applied to output 3D image data, into which an OSD has been inserted, to an outside, so that the OSD can be normally displayed.

Figure 14:
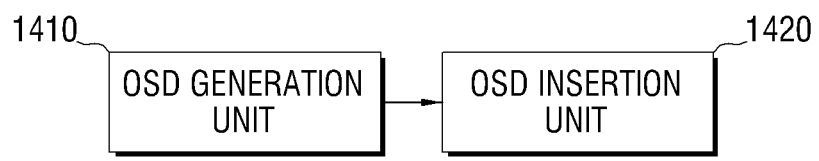
FIG. 14 is a block diagram illustrating the configuration of a 3D video apparatus according to an exemplary embodiment of the present invention.

With reference to FIGS. 14 to 19, other exemplary embodiments of the present invention are described. FIG. 14 is a block diagram illustrating the configuration of a 3D video apparatus according to an exemplary embodiment of the present invention.

As illustrated in FIG. 14, the 3D video apparatus includes an OSD generation unit 1410 and an OSD insertion unit 1420. The OSD generation unit 1410, in the case of generating an OSD to be displayed on a 3D image, generates a reduced OSD that is smaller than an OSD that is displayed on a 2D image. The OSD insertion unit 1420 inserts the generated OSD into the input 3D image data.

Figure 15:
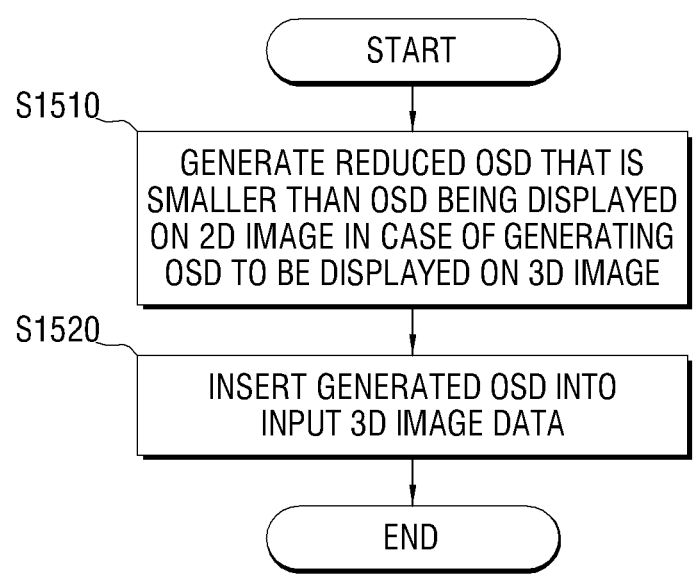
FIG. 15 is a flowchart illustrating a method of providing an OSD according to an exemplary embodiment of the present invention.

FIG. 15 is a flowchart illustrating a method of providing an OSD according to an exemplary embodiment of the present invention. In the case of generating an OSD to be displayed on a 3D image, the 3D video apparatus generates a reduced OSD that is smaller than the OSD that is displayed on the 2D image (S1510). Then, the 3D video apparatus inserts the generated OSD into the input 3D image data (S1520).

Figure 16:
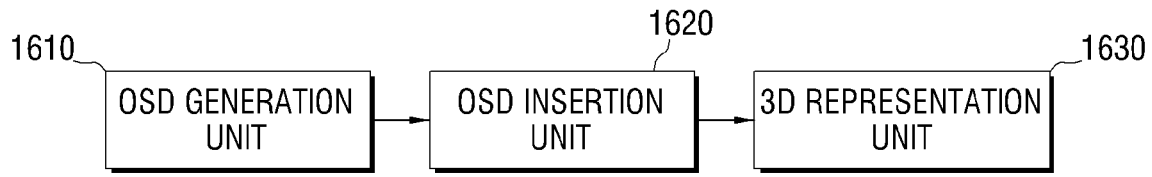
FIG. 16 is a block diagram illustrating the configuration of a 3D video apparatus according to another exemplary embodiment of the present invention.

FIG. 16 is a block diagram illustrating the configuration of a 3D video apparatus according to another exemplary embodiment of the present invention. As illustrated in FIG. 16, the 3D video apparatus includes an OSD generation unit 1610, an OSD insertion unit 1620, and a 3D representation unit 1630.

The 3D representation unit 1630 generates a left-eye image and a right-eye image to be displayed on a screen using input 3D image data. The OSD generation unit 1610 generates an OSD. The OSD insertion unit 1620 inserts the generated OSD into at least one of the left-eye image and the right-eye image.

Figure 17:
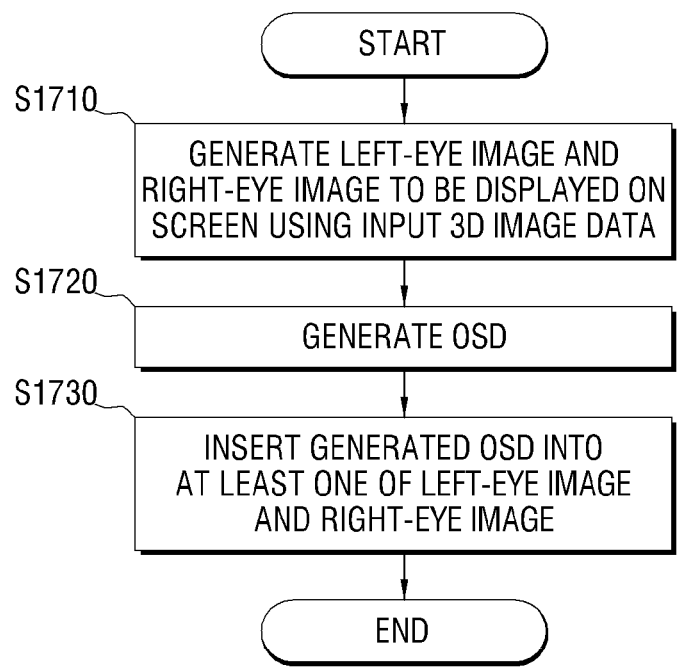
FIG. 17 is a flowchart illustrating a method of providing an OSD according to another exemplary embodiment of the present invention.

FIG. 17 is a flowchart illustrating a method of providing an OSD according to another exemplary embodiment of the present invention. A 3D video apparatus generates a left-eye image and a right-eye image to be displayed on a screen using input 3D image data (S1710). The 3D video apparatus generates an OSD (S1720), and inserts the generated OSD into at least one of the left-eye image and the right-eye image (S1730).

Figure 18:
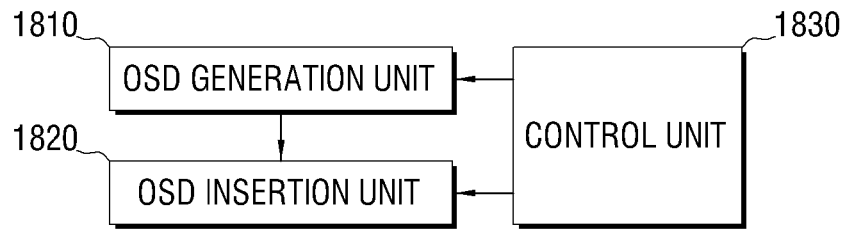
FIG. 18 is a block diagram illustrating the configuration of a 3D video apparatus according to still another exemplary embodiment of the present invention.

FIG. 18 is a block diagram illustrating the configuration of a 3D video apparatus according to another exemplary embodiment of the present invention. An OSD generation unit 1810 generates an OSD. The OSD insertion unit 1820 inserts the OSD into an input 3D image. If the OSD is activated while a 3D video apparatus operates in a 3D image display mode, a control unit 1830 operates to change the present display mode to a 2D image display mode and to display a 3D image, into which the OSD has been inserted, in the 2D image display mode.

Figure 19:
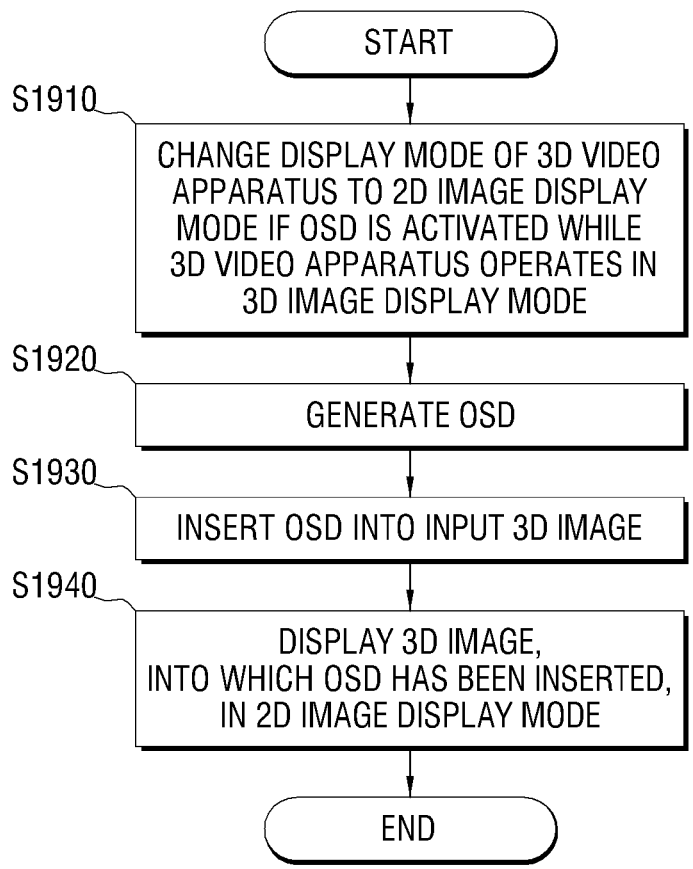
FIG. 19 is a flowchart illustrating a method of providing an OSD according to still another exemplary embodiment of the present invention.

FIG. 19 is a flowchart illustrating a method of providing an OSD according to another exemplary embodiment of the present invention. If an OSD is activated while a 3D video apparatus operates in a 3D image display mode, the 3D video apparatus changes the present display mode to a 2D image display mode (S1910). The 3D video apparatus generates an OSD (S1920), and inserts the OSD into an input 3D image (S1930). The 3D video apparatus displays the 3D image, into which the OSD has been inserted, in the 2D image display mode (S1940).

According to exemplary embodiments of the present invention, in the case of generating an OSD to be displayed on a 3D image, a reduced OSD that is smaller than an OSD that is displayed on a 2D image is generated and inserted into 3D image data, so that the OSD can be normally provided even in a 3D video apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A three-dimensional (3D) video apparatus for representing a 3D image, the apparatus comprising:
   a display screen;
   an on-screen display (OSD) generation unit which receives an OSD object and generates a reduced OSD object to be displayed on the 3D image on the display screen, from the received OSD object, wherein the reduced OSD object is smaller than the received OSD object being displayed on a two-dimensional (2D) image; and
   an OSD insertion unit which inserts the reduced OSD object into at least one of a left data region and a right data region of input 3D image data,
   wherein each of the left data region and the right data region is enlarged or interpolated with a size of the whole display screen using the input 3D image data.

2. The 3D video apparatus of claim 1, wherein the input 3D image data includes a left-eye image data and a right-eye image data, and the OSD generation unit generates the reduced OSD object by reducing a size of the received OSD object to correspond to an image size of one of the left-eye image data and the right-eye image data.

3. The 3D video apparatus of claim 2, wherein the OSD insertion unit inserts the reduced OSD object into at least one of the left-eye image data and the right-eye image data.

4. The 3D video apparatus of claim 1, wherein the input 3D image data includes a left-eye image data and a right-eye image data included in a first data region and a second data region of a frame data region, respectively, and the OSD generation unit generates the reduced OSD object by reducing a size of the received OSD object in a horizontal direction.

5. The 3D video apparatus of claim 1, wherein the input 3D image data includes a left-eye image data and a right-eye image data included in a first data region and a second data region of a frame data region, respectively, and the OSD generation unit generates the reduced OSD object by reducing a size of the received OSD object in a vertical direction.

6. The 3D video apparatus of claim 1, wherein the input 3D image data includes two-dimensional (2D) image data and depth data, and the OSD generation unit generates the reduced OSD object by reducing a size of the received OSD object in proportion to a size of the 2D image data.

7. The 3D video apparatus of claim 6, wherein the OSD insertion unit inserts the reduced OSD object into the 2D image data.

8. The 3D video apparatus of claim 1, wherein the OSD generation unit generates the reduced OSD object by reducing a size of the received OSD object in at least one of a horizontal direction and a vertical direction.

9. The 3D video apparatus of claim 1, wherein the OSD insertion unit inserts the reduced OSD object into an input 3D image data region, which corresponds to one of four-divided screen regions that is positioned on a left upper part of the screen.

10. A method of providing an on-screen display (OSD) in a three-dimensional (3D) video apparatus, the method comprising:
    receiving an OSD object;
    generating a reduced OSD object to be displayed on the 3D image on a display screen, from the received OSD object, wherein the reduced OSD object is smaller than the received OSD object being displayed on a two-dimensional (2D) image; and
    inserting the reduced OSD object into at least one of a left data region and a right data region of input 3D image data,
    wherein each of the left data region and the right data region is enlarged or interpolated with a size of the whole display screen using the input 3D image data.

11. The method of claim 10, wherein the input 3D image data includes a left-eye image data and a right-eye image data, and the generating the reduced OSD object comprises:
    reducing a size of the received OSD object to correspond to an image size of one of the left-eye image data and the right-eye image data.

12. The method of claim 11, further comprising:
    inserting the reduced OSD object into at least one of the left-eye image data and the right-eye image data.

13. The method of claim 10, wherein the input 3D image data includes a left-eye image data and a right-eye image data included in a first data region and a second data region of a frame data region, respectively, and the generating the reduced OSD object comprises:

reducing a size of the received OSD object in a horizontal direction.

14. The method of claim 10, wherein the input 3D image data includes a left-eye image data and a right-eye image data included in a first data region and a second data region of a frame data region, respectively, and the generating the reduced OSD object comprises:

reducing a size of the received OSD object in a vertical direction.

15. The method of claim 10, wherein the input 3D image data includes two-dimensional (2D) image data and depth data, and the generating the reduced OSD object comprises:

reducing a size of the received OSD object in proportion to a size of the 2D image data.

16. The method of claim 15, wherein the inserting the reduced OSD object comprises:

inserting the reduced OSD object into the 2D image data.

17. The method of claim 10, wherein the generating the reduced OSD object comprises:

reducing a size of the received OSD object in at least one of a horizontal direction and a vertical direction.

18. The method of claim 10, wherein the inserting the reduced OSD object comprises:

inserting the reduced OSD object into an image data region, which corresponds to one of four-divided screen regions of the screen that is positioned on a left upper part of the screen.

19. A three-dimensional (3D) video apparatus for representing a 3D image, the apparatus comprising:

a display screen a 3D representation unit which generates a left-eye image and a right-eye image to be displayed on the display screen using input 3D image data;

an on-screen display (OSD) generation unit which generates an OSD object; and an OSD insertion unit which inserts the generated OSD object into at least one of the generated left-eye image frame and the generated right-eye image frame of the input 3D image data, wherein each of the generated left-eye image frame and the generated right-eye image frame is enlarged or interpolated with a size of the whole display screen using the input 3D image data.

20. A method of providing an on-screen display (OSD) in a three-dimensional (3D) video apparatus, the method comprising:

generating a left-eye image and a right-eye image to be displayed on a display screen using input 3D image data;

generating an OSD object; and inserting the generated OSD object into at least one of the generated left-eye image frame and the generated right-eye image frame of the 3D input image data, wherein each of the generated left-eye image frame and the generated right-eye image frame is enlarged or interpolated with a size of the whole display screen using the input 3D image data.

21. A three-dimensional (3D) video apparatus for representing a 3D image, the apparatus comprising:

an on-screen display (OSD) generation unit which generates an OSD object;

an OSD insertion unit which inserts the generated OSD object into at least one of the generated left-eye image frame and the generated right-eye image frame of an input 3D image; and a control unit which determines whether an OSD display is activated while the 3D video apparatus operates in a 3D image display mode, changes a display mode of the 3D video apparatus from the 3D image display mode to a two-dimensional (2D) image display mode, and displays the 3D image including the inserted OSD object in the 2D image display mode, wherein each of the generated left-eye image frame and the generated right-eye image frame is enlarged or interpolated with a size of the whole display screen using the input 3D image data.

22. A method of providing an on-screen display (OSD) in a three-dimensional (3D) video apparatus for representing a 3D image, the method comprising:

changing a display mode of the 3D image video apparatus from a 3D image display mode to a two-dimensional (2D) image display mode if the OSD is activated while the 3D video apparatus operates in the 3D image display mode;

generating an OSD object;

inserting the generated OSD object into at least one of the generated left-eye image frame and the generated right-eye image frame of an input 3D image; and displaying the 3D image including the inserted OSD object in the 2D image display mode, wherein each of the generated left-eye image frame and the generated right-eye image frame is enlarged or interpolated with a size of the whole display screen using the input 3D image data.

* * * * *